*INVENTORS.*
Charles J. Plank &
Edward J. Rosinski.

ATTORNEY.

United States Patent Office 3,431,218
Patented Mar. 4, 1969

3,431,218
CONVERSION OF CLAYS TO CRYSTALLINE ALUMINOSILICATES AND CATALYSTS THEREFROM
Charles J. Plank, Woodbury, and Edward J. Rosinski, Deptford, N.J., assignors to Mobil Oil Corporation, a corporation of New York
Continuation-in-part of application Ser. No. 186,794, Apr. 11, 1962. This application Oct. 26, 1966, Ser. No. 589,720
U.S. Cl. 252—455  24 Claims
Int. Cl. B01j 11/40

ABSTRACT OF THE DISCLOSURE

This invention relates to a method of converting natural clays to crystalline aluminosilicate zeolites, to the preparation of improved hydrocarbon conversion catalysts from such zeolites, to the resulting catalysts, and to conversion of hydrocarbons in the presence of such catalysts. The invention involves synthesizing crystalline aluminosilicate zeolite by treatment of natural clay with a caustic-containing solution under such conditions of time and temperature as to effect conversion of at least a portion of the reaction mixture to a crystalline aluminosilicate zeolite. A further aspect of the invention involves compositing such crystalline zeolite with an inorganic oxide matrix and forming the composite into discrete catalyst particles, the crystalline zeolite having been subjected to ion-exchange to reduce the alkali metal content, e.g., sodium content thereof, either prior or subsequent to the compositing step.

Related applications

This application is a continuation-in-part of (1) application Ser. No. 186,794, filed Apr. 11, 1962, now abandoned and (2) application Ser. No. 487,610, filed Sept. 15, 1965, now abandoned, which is, in turn, a continuation-in-part of application Ser. No. 186,804, filed Apr. 11, 1962, now abandoned.

Brief summary of the invention

The present invention relates to a method for converting a clay to a crystalline aluminosilicate suitable for use in a cracking catalyst, this method comprising mixing a clay with sodium hydroxide and digesting the resultant reactant mixture in the presence of water at such temperature and time as to effect conversion of at least a portion of said reaction mixture to crystalline aluminosilicate. The digestion may be carried out in the presence of an added source of silica. Thereafter the crystalline aluminosilicate is desirably ion-exchanged with cations selected from the group consisting of hydrogen, ammonium, and polyvalent metals under such conditions as to markedly reduce the sodium content of the crystalline aluminosilicate. The invention further relates to compositing the foregoing crystalline zeolite with an inorganic oxide matrix and forming the composite into discrete catalyst particles, the zeolite having been subjected to ion-exchange to reduce its alkali metal content either prior or subsequent to the compositing step. Finally, the invention is directed to the composite catalyst formed by the foregoing method and to the catalytic conversion of hydrocarbons using such catalysts.

Description of the drawings

This invention will be best understood by a consideration of the following detailed description taken in conjunction with the accompanying drawings wherein.

DETAILED DESCRIPTION

First embodiment

Figure 3:
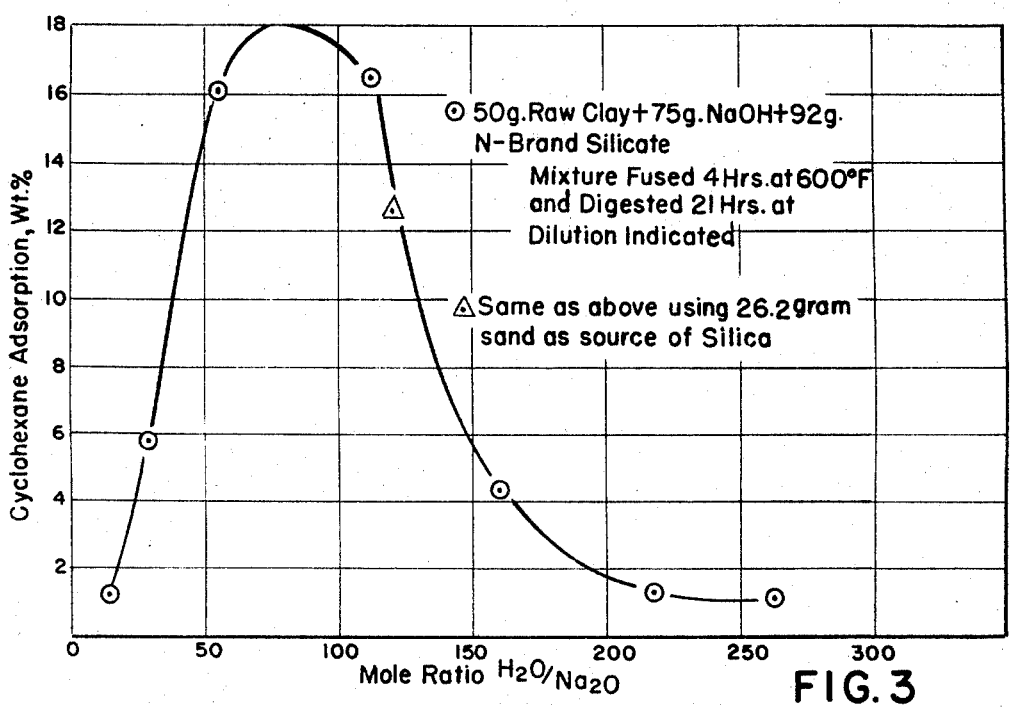
FIG. 3 is a plot of cyclohexane adsorption against mole ratio of $H_2O$ to $Na_2O$ for the digestion mixture employed in Examples 66–71.

There will first be described that embodiment relating to the conversion of natural clays to crystalline aluminosilicate zeolites.

Crystalline aluminosilicate zeolites structurally consist basically of an open three-dimensional framework of $SiO_4$ and $AlO_4$ tetrahedra. Such tetrahedra are cross-linked by the sharing of oxygen atoms, so that the ratio of oxygen atoms to the total of the aluminum and silicon atoms is equal to two. The negative electrovalence of tetrahedra containing aluminum is balanced by the inclusion within the crystal of cations, such as alkali or alkaline earth metal ions.

Many zeolites possess a crystal structure, having channels of molecular dimensions. The interstitial spaces are generally originally occupied by water of hydration. After at least partial dehydration, these zeolites may be utilized as efficient adsorbents whereby adsorbate molecules are retained within the interstitial spaces. The interstitial dimensions of openings in the crystal lattice limit the size and shape of the molecules that can be adsorbed. A separation of a mixture of various molecules, based upon molecular dimensions, wherein certain molecules are adsorbed by the zeolite while others are excluded from admission is therefore possible. It is such characteristic of many crystalline zeolites that has led to their designation as "molecular sieves."

Molecular sieve materials are unusually porous, the pores having highly uniform molecular dimensions, generally between about 3 and about 15 angstrom units in diameter. Each crystal of molecular sieve material contains literally billions of tiny cavities or cages interconnected by channels of unvarying diameter. The size and portion of the metal ions in the crystal control the effective diameter of the interconnecting channels. As initially prepared, the metal of the aluminosilicate is an alkali metal and usually sodium. Such alkali metal is subject to base-exchange with a wide variety of other metal ions. The molecular sieve material may also be of the A type, X type, Y type or other well known form of molecular sieve.

Preparation of these molecular sieves is well known, having been described in the literature, for example in U.S. 2,882,243, U.S. 2,882,244 and Belgium Patent No. 577,642. Thus, molecular sieves available commercially include the 13X and 10X types which are sodium and sodium-calcium crystalline aluminosilicates, capable of adsorbing molecules whose critical diameter is less than about 10 angstrom units, and the 4A and 5A types which are sodium and sodium-calcium crystalline aluminosilicates having channel diameters which will permit adsorption of molecules smaller than about 4 and 5 angstrom units, respectively. Both X and Y type crystalline aluminosilicates have essentially identical crystal structures. These zeolites each contain a total of 192 silicon plus aluminum tetrahedra per unit cell. They differ from each other in chemical composition. Type X aluminosilicate has been characterized as having a unit cell formula within the range $$M_{94/n}[(AlO_2)_{94}(SiO_2)_{98}]$$

to and including $$M_{77/n}[(AlO_2)_{77}(SiO_2)_{115}]$$

where M is a cation of valence $n$. Type Y aluminosilicate has a higher $SiO_2/Al_2O_3$ ratio than shown in the latter formula. The terms zeolites X and Y accordingly do not refer to specific chemical entities of fixed composition, but rather refer to a range of compositions of essentially identical crystal structure.

One aspect of the present invention is directed particularly to conversion of a natural clay to synthetic aluminosilicate zeolites of the X and Y type. It has heretofore been proposed to prepare synthetic crystalline zeolites by initially calcining a clay at an elevated temperature, such as 500 to 800° C., for an extended period of time and thereafter aging the calcined clay with caustic at ambient temperatures for 2 to 3 days and finally reacting the aged mixture at a temperature approximating 100° C. for an additional period of time. Such three-step process, while affording conversion of the clay to synthetic zeolite, has proved to be time consuming and unattractive from a commercial standpoint.

In accordance with one aspect of the present invention there is provided a new and improved method for converting natural clays to crystalline aluminosilicate zeolites. The method described herein has the very distinct advantage over previously suggested processes in that aging of the calcined clay with caustic at ambient temperatures over an extended period of time is eliminated and there is provided a much more rapid conversion of the clay to the desired crystalline zeolite product as compared with previously known processes.

Broadly, this process involves mixing a clay with caustic, preferably sodium hydroxide, and advantageously in the presence of silica or a compound capable of providing silica during the subsequent digestion, and digesting the reaction mixture in the presence of water under such conditions of temperature and time as to cause crystallization of at least a portion of the reaction mixture to produce a crystalline aluminosilicate. Of course, where less than all of the reaction mixture is converted to crystalline aluminosilicate, the resultant product will contain residual unconverted solid material in admixture with the crystalline aluminosilicate.

It has been found that certain composition limits within the reaction mixture are desirable for optimum results. When such limits are observed, a clay may be contacted with caustic and desirably with silica at a temperature between about 230° F. and about 1600° F. for a period of between about 3 minutes and about 72 hours, followed by digestion of the resulting fused product in water at a temperature in the approximate range of 180° F. to 220° F. until crystalline aluminosilicate forms, usually for a period of at least about 8 and generally at least about 16 hours. This procedure affords a high yield of crystalline aluminosilicate zeolite of the X-Y type. Naturally occurring hydrous aluminum silicate clays may be converted by the present process to crystalline molecular sieve type aluminosilicates. Clays undergoing conversion in accordance with the foregoing method generally contain at least one of the following as the chief mineral constituent: kaolinite, halloysite, montmorillonite, anauxite, nacrite and dickite. While clays of the foregoing type generally may be treated in accordance with the foregoing method, including those clays which have undergone previous acid treatment and/or calcination, it is preferred to employ directly a raw uncalcined natural clay, thereby further speeding up the conversion process with elimination of the initial clay calcination step, essential in the previously known processes.

In accordance with a preferred aspect of the foregoing process in the first step the clay, in the form of an aqueous slurry, is treated with an alkali metal hydroxide, preferably, sodium hydroxide, desirably having reactable silica added thereto, under conditions of substantially atmospheric pressure and at a temperature above about 230° F. and preferably above about 400° F. but not exceeding about 1600° F. The duration of such treatment will depend largely on the temperature employed and may extend from about 3 minutes at a temperature of 1600° F. to about 72 hours at a temperature of about 230° F. Preferably, a reaction period of between about 3 minutes and about 5 hours at a temperature in the approximate range of 400° F. to 1600° F. is employed. Utilizing a reaction temperature of 1000–1200° F., the period of treatment is approximately one half hour. Under the foregoing conditions, a fused aluminosilicate composite or frit is formed.

In the second step of the process, the fused material or frit is desirably ground to a finely divided state of generally less than 60 mesh, and the resulting finely divided material is dispersed in water. The grinding of the frit to a particle size of less than 60 mesh is essential where there is desired a final product having a high degree of crystallinity, as shown by Example 75 hereinafter.

Digestion of the dispersed solid in the resulting aqueous alkaline solution maintained at a temperature within the approximate range of 180° F. to 220° F. is carried out for a period of at least about 8 and preferably greater than 16 hours. Generally, the digestion period does not exceed about 72 hours, although longer periods may be used without adverse effect on the resulting crystalline aluminosilicate product.

To achieve a resulting aluminosilicate of high crystallinity, it has been found desirable to disperse the finely ground solid in the water in a closely controlled manner prior to the digestion step. Initially, the finely ground solid is slurried at a fairly high concentration, utilizing a water to solid weight ratio of approximately 1 to 3 for a short interval of time, generally not exceeding about 30 minutes. Thereafter, the slurry is diluted with a large volume of water bringing the molar ratio of water to total alkali metal oxide within the approximate range of 35 to 180, after which digestion proceeds as described above. The resulting highly adsorbent crystalline sodium aluminosilicate product is removed from the reaction mixture, suitably washed free of soluble matter and thereafter dried. X-ray analysis of the product so obtained shows the same to be a crystalline aluminosilicate of the X-Y type.

The slurry of aluminosilicate resulting from treatment of natural clay, as described above, may suitably be formed into very finely divided particles by spray drying. The product so obtained is in fluidized form being made up of particles having a diameter of less than 300 microns. Such product is particularly applicable for use in operations employing a fluidized particle-form contact material. It is, in fact, one of the advantages of the present invention that the treatment of natural clay with a caustic-containing solution may be controlled to afford a product of predetermined crystallinity and the slurry resulting from such controlled treatment thereafter be formed into particles of desired size by various techniques, such as spray drying. The slurry of aluminosilicate may be dispersed in the upper part of a chamber or tower through which a current of drying gas is passed. The drying gas, which may be air, is usually supplied in heated conditions generally at a temperature between about 600° F. and 1000° F. to accelerate the rate of drying of the particles. Dispersion may be effected by any well known method such as impinging a stream thereof on to a rapidly rotating disc by forcing it through a nozzle provided with multiple orifices or by spraying through a nozzle designed to impart a high velocity to the slurry and break up into fine particles of relatively uniform size. Contact between the hot gases and the product is maintained for a relatively short interval of time. The slurry prior to spraying usually contains between about 4 and about 10 percent solids. It is generally preferred to disperse the slurry in the form of droplets having a diameter of about 200–400 microns which, on drying, results in a product of about 100–300 microns diameter.

Where it is desired to obtain aluminosilicate zeolites having a crystallinity of at least 50%, it is critical, as will be evident from the data hereinafter set forth, that ratios of total alkali metal oxide/water-free clay, silica/water-free clay and water total alkali metal oxide, as well as the temperature and time of contact during the initial high temperature step and the subsequent digestion step, be precisely controlled. Products having more than 50 percent crystallinity corresponding to high adsorptive properties are prepared by controlling the total alkali metal oxide/water-free clay weight ratio within the range of 1.1 to 6.6 and added $SiO_2$/water-free clay weight ratio within the range of 0.01 to 3.7. It is highly desirable that silica or a compound capable of furnishing silica under the reaction conditions be present in the initial high temperature reaction mixture to afford a product possessing a high degree of crystallinity. Such silica may be added from any suitable source such as alkali metal silicate, sand, quartz, siliceous earths, colloidal silica, silica gel and ethyl ortho silicate.

The preferred conditions and concentrations of reactants employed in the present method may be summarized as follows:

| Preferred Reaction Conditions | Limits for 50% Crystallinity | Preferred Limits for High Crystallinity |
|---|---|---|
| Wt. Ratio total alkali metal oxide/water-free clay | 1.1–6.6 | 1.1–5.1 |
| Wt. Ratio added $SiO_2$/water-free clay | .01–3.7 | 0.19–3.3 |
| Mole Ratio $H_2O$/total alkali metal oxide | 35–180 | 35–115 |

Figure 1:
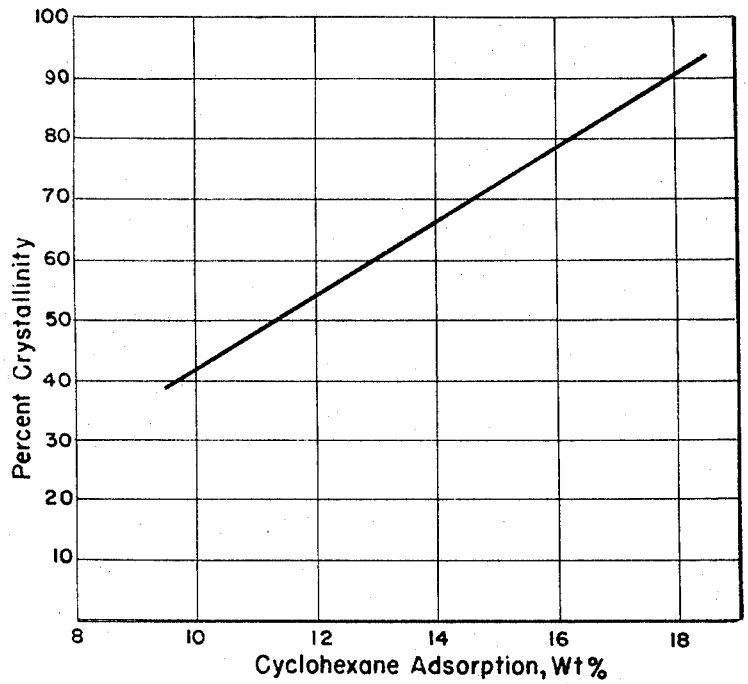
FIG. 1 is a plot of percent crystallinity against cyclohexane adsorption for crystalline aluminosilicate zeolites and graphically represents the relationship.

The degree of clay conversion can be controlled by the variables above indicated. Materials ranging from amorphous to highly crystalline alkali metal aluminosilicate may be prepared. Products having a high degree of adsorption as measured by the ability to absorb above 11 percent by weight of cyclohexane are characterized by X-ray analysis as having a major proportion of crystalline aluminosilicate of the 13X type with some shift, generally 10 to 40 percent, to the Y type structure. The materials having high cyclohexane adsorption were found, upon analysis, to be essentially entirely X-Y type crystalline aluminosilicates. Thus, due to the simplicity of the cyclohexane adsorption test, this parameter was used herein to characterize present products. The relationship between crystallinity, by X-ray analysis, and cyclohexane adsorption is shown graphically in FIGURE 1.

The products obtained, as indicated hereinabove, are primarily crystalline alkali metal aluminosilicate molecular sieve zeolites. Other ions may, if desired, be introduced into the zeolite structure by base exchange of the alkali metal ions. Such exchange cation replaces the alkali metal ions and modifies the adsorption and catalytic properties of the zeolite. Suitable replacing ions include monovalent or divalent cations, such as silver and magnesium; calcium or strontium; metal ions of the transition metals; the rare earth metals such as cerium, lanthanum, praseodymium, neodymium, samarium and mixtures thereof with each other and the other rare earths; and other ions, for example hydrogen and ammonium which can behave as metals in replacing alkali metal ions without causing any appreciable change in the basic structure of the zeolite crystal. The transition metals are those whose atomic numbers are from 21 to 28, from 39 to 46 and from 72 to 78 inclusive, namely scandium, titanium, vanadium, chromium, manganese, iron, cobalt, nickel, yttrium, zirconium, niobium, molybdenum, ruthenium, rhodium, palladium, platinum, hafnium, tantalum, tungsten, rhenium, osmium and iridium. It is also within the purview of the present invention to introduce the foregoing ions into the structure of the resulting crystalline aluminosilicate during the initial high temperature step by including in the reaction mixture a suitable compound of the metal which it is desired to so introduce. The resulting product is thereafter dispersed in water and subjected to the digestion treatment described hereinabove.

Second embodiment

There will now be described a second embodiment of our invention, relating to an improved hydrocarbon conversion catalyst, to a method for making the same, and to conversion of hydrocarbons in the presence thereof. This embodiment of the invention is concerned with a catalytic composition resulting from treatment of natural clays with a caustic-containing solution to yield a highly adsorptive product followed by ion-exchange of such product to introduce therein an ion selected from the group consisting of an alkaline earth metal, a rare earth metal, ammonium, hydrogen and mixtures thereof with one another. One aspect of this embodiment is concerned with an improved aluminosilicate cracking catalyst characterized by unusual activity, selectivity and steam stability. Another aspect of this embodiment is directed to a process for cracking heavy petroleum fractions to lighter materials boiling in the gasoline range in the presence of the aforesaid catalyst.

As is well known, there are numerous materials both of natural and synthetic origin which have the ability to catalyze the cracking of hydrocarbons. However, the mere ability to catalyze cracking is far from sufficient to afford a catalyst of commercial significance. Of the presently commercially available cracking catalysts, a synthetic silica-alumina gel composite is by far the most widely used. While such type catalyst is superior in many ways to the earlier employed clay catalysts and is fairly satisfactory, it is subject to improvement particularly in regard to its ability to afford a high yield of useful product with a concomitant small yield of undesired product.

During catalytic conversion of high boiling hydrocarbons to lower boiling hydrocarbons the reaction which takes place is essentially a cracking to produce lighter hydrocarbons but is accompanied by a number of complex side reactions such as aromatization, polymerization, alkylation and the like. As a result of these complex reactions, a carbonaceous deposit is laid down on catalyst commonly called "coke." The deposition of coke tends to catalytically impair the catalytic efficiency of the catalyst for the principal reactions and the conversion reaction is thereafter suspended when coke to the extent of a few percent by weight has accumulated on the catalyst. The catalyst is then regenerated by burning the coke therefrom in a stream of oxidizing gas and the catalyst, so regenerated, is returned to the conversion stage of the cycle.

As will be realized, coke and other undesired products are formed at the expense of useful products such as gasoline. It will also be evident that during the period of regeneration the catalyst is not being effectively employed for conversion purposes. It accordingly is highly desirable not only to afford a large overall conversion of the hydrocarbon charge, i.e. to provide a catalyst of high activity, but also to afford an enhanced yield of useful product such as gasoline while maintaining undesired product such as coke at a minimum. The ability of a cracking catalyst to so control and to direct the course of conversion is referred to as selectivity. Thus, an exceedingly useful and widely sought characteristic in a cracking catalyst is high selectivity.

Another important property desirable in a cracking catalyst is steam stability, i.e. the ability not to become deactivated in the presence of steam at an excessively high rate. As a result of coke formation, it has generally been necessary to regenerate the catalyst at frequent intervals first by stripping entrained oil by contacting with steam and then burning off the carbonaceous deposits by contecting with a gas containing free oxygen at an elevated temperature. However, it has been observed that the cracking activity of the catalyst deteriorates upon repeated use and regeneration and that the silicia-alumina catalysts heretofore employed are sensitive to steaming. Since steaming has been found to be the most effective way of removing entrained oil from the spent catalyst prior to thermal regeneration with air and since steam is encountered in the seals and kiln of a commercial catalytic cracking unit, it is apparent that a catalyst characterized by a good steam stability is definitely to be desired.

In accordance with one aspect of this embodiment of the present invention, there is provided a catalyst for conversion of hydrocarbons characterized by high activity, exceptional selectivity and steam stability. In its broadest aspect, the method for obtaining the foregoing catalyst involves mixing a clay with sodium hydroxide, digesting the resultant reaction mixture in the presence of water at such temperature and time as to effect conversion of at least a portion of the reaction mixture to a crystalline aluminosilicate zeolite, and compositing the resulting crystalline zeolite with an inorganic oxide matrix of clay or amorphous oxides, the crystalline zeolite having been subjected to ion-exchange either prior or subsequent to the compositing step, the cations in the ion-exchange solution being selected from the group consisting of hydrogen, ammonium and polyvalent metals, to thereby substantially reduce the alkali metal content, e.g., sodium content, of the zeolite.

According to a preferred procedure, the catalyst is one resulting from treatment of a naturally occurring clay in the form of an aqueous slurry with an alkali metal hydroxide, preferably sodium hydroxide, and desirably silica, at a temperature between about 230° F. and about 1600° F. for a period of between about 3 minutes and about 72 hours, and digesting the resulting fused product in water at a temperature of 180° F. to 220° F. for a period of at least about 8 and generally at least about 16 hours. The resulting porous product, consisting essentially of an alkali metal aluminosilicate, is thereafter base-exchanged with a solution containing ions of at least one member selected from the group consisting of alkaline earth metals, rare earth metals, ammonium, hydrogen and mixtures thereof with one another to replace a major proportion of the alkali metal and to reduce the alkali metal content of the treated composite to below about 4 percent, and preferably below about 3 percent by weight.

The invention additionally provides a preferred method for preparing a unique cracking catalyst by treating a natural clay with alkali metal hydroxide and desirably silica at a temperature between about 230° F. and about 1600° F. for a period of between about 3 minutes and about 72 hours, subsequently digesting the resulting fused product in water at a temperature in the approximate range of 180° F. to 220° F. for a period of at least about 8 and generally at least about 16 hours, and ion exchanging the resulting alkali metal aluminosilicate with at least one member selected from the group consisting of alkaline earth metals, rare earth metals, ammonium, hydrogen and mixtures thereof with one another.

The invention additionally affords a method for preparing a hydrocarbon conversion catalyst by dispersing in a suitable matrix a finely divided product resulting from treatment of a natural clay as indicated hereinabove and drying and calcining the resulting composite.

The invention also affords a method for preparing a cracking catalyst having exceptional activity and selectivity consisting essentially of 2 to 90% by weight of a product having a weight mean particle diameter of less than 40 microns suspended in and distributed throughout a hydrous oxide matrix selected from the group consisting of clays and inorganic oxide gels, which product has been obtained by treatment of a natural clay with alkali metal hydroxide and desirably silica at a temperature between about 230° F. and about 1600° F. for a period of between about 3 minutes and about 72 hours, subsequently digesting the resulting fused product in water at a temperature in the approximate range of 180° F. to 220° F. for a period of at least about 8 and generally at least about 16 hours, and effecting ion-exchange of the resulting alkali metal aluminosilicate with at least one ion selected from the group consisting of alkaline earth metals, rare earth metals, ammonium and hydrogen.

The invention further affords a catalytic composition comprising spheroidal particles consisting essentially of 2 to 50 percent by weight of a product having a weight mean particle diameter of less than about seven (7) microns suspended in and distributed throughout a matrix of an inorganic oxide gel selected from the group consisting of alumina, silica and composities of silica with an oxide of at least one metal selected from the group consisting of metals of Groups II–A, III–B, and IV–A of the Periodic Table, which product has been obtained as a result of treating a naturally occurring clay with alkali metal hydroxide and desirably silica under particularly controlled and specified conditions at a temperature between about 230° F. and about 1600° F. for a period of between about 3 minutes and about 72 hours and subsequently digesting the resulting fused product in water at a termperature in the approximate range of 180° F. to 220° F. for a period of at least about 8 and generally at least about 16 hours to produce a resulting alkali metal aluminosilicate and replacing, by ion-exchange, substantially all of the alkali metal content of said aluminosilicate with at least one ion selected from the group consisting of alkaline earth metals, rare earth metals, ammonium and hydrogen.

The invention additionally provides a process for catalytic cracking of hydrocarbon oils in the presence of the above catalysts in accordance with which enhanced conversion of the charge stock to useful products is realized.

Naturally occurring hydrous aluminum silicate clays are employed herein as starting materials. Clays undergoing conversion in accordance with the present method generally contain at least one of the following as the chief mineral constituent: kaolinite, halloysite, montmorillonite, anauxite, nacrite and dickite.

As previously noted, in its broadest aspect the method for preparing the cracking catalysts of this invention involves initially mixing a clay with sodium hydroxide, desirably in the presence of silica, and thereafter digesting the resultant reaction mixture in the presence of water at such temperature and time as to effect crystallization of at least a portion of the reaction mixture to a crystalline aluminosilicate zeolite. Of course, while the digestion may be carried out so as to effect virtually complete conversion of the reaction mixture to crystalline aluminosilicate zeolite, such complete conversion is not essential to the process of preparing the catalysts of our invention. Thus, where only a portion of the reactants are converted to crystalline aluminosilicate zeolite, resulting in crystalline aluminosilicate zeolite in admixture with solid material unconverted to crystalline aluminosilicate zeolite, such admixture may nevertheless advantageously be employed in the preparation of our catalysts, as will be described in more detail hereinafter.

such as alkali metal silicate, sand, quartz, siliceous earths, colloidal silica, silica gel, and ethylortho silicate.

The preferred reaction conditions and concentrations of reactants employed in the present method may be summarized as follows:

| Preferred Reaction Conditions | Limits for Amorphous or Low Crystallinity | Limits for 50% Crystallinity | Limits for High Crystallinity |
|---|---|---|---|
| Wt. Ratio total alkali metal oxide/water-free clay | 0.95-7.4 | 1.1-6.6 | 1.1-5.1 |
| Wt. Ratio added SiO$_2$/water-free clay | 0.01-3.8 | .01-3.7 | 0.19-3.3 |
| Mole Ratio H$_2$O/total alkali metal oxide | 35-180 | 35-180 | 35-115 |

A preferred first step in the instant process of catalyst preparation involves treating the natural clay, in the form of an aqueous slurry, with an alkali metal hydroxide, preferably sodium hydroxide, desirably having reactable silica added thereto, under conditions of substantially atmospheric pressure and at a temperauture of above about 230° F. and preferably above about 400° F. but not exceeding about 1600° F. The duration of such treatment will depend largely on the temperature employed and may extend from about 3 minutes at a temperature of 1600° F. to about 72 hours at a temperature of about 230° F. Under the foregoing conditions, a fused aluminosilicate composite is formed.

The fused material so obtained is dispersed in water, preferably after being ground to a finely divided state of generally less than 60 mesh. Digestion of the dispersed solid in the resulting aqueous alkaline solution maintained at a temperature within the approximate range of 180° F. to 220° F. is carried out for a period of at least about 8 and preferably greater than 16 hours. Generally, the digestion period does not exceed about 72 hours, although longer periods may be used without adverse effect on the resulting aluminosilicate product.

To achieve a resulting aluminosilicate of high crystallinity, it has been found desirable to disperse the finely ground solid in water in a closely controlled manner prior to the digestion step. Initially, the finely ground solid is slurried at a fairly high concentration, utilizing a water to solid weight ratio of approximately 1 to 3 for a short interval of time, generally not exceeding about 30 minutes. Thereafter, the slurry is diluted with a large volume of water bringing the molar ratio of water to alkali metal oxide within the approximate range of 35 to 180, after which digestion proceeds as described above. The resulting highly adsorbent crystalline alkali metal aluminosilicate product obtained is removed from the reaction mixture, suitably washed free of soluble matter and thereafter may be dried. X-ray analysis of the product so obtained shows the same to be a crystalline aluminosilicate of the X-Y type.

The ratios of total alkali metal oxide/water-free clay, silica/water-free clay and water/total alkali metal oxide as well as the temperature and time of contact during the initial high temperature step and the subsequent digestion step preferably should be precisely controlled. Products which vary from primarily amorphous to those which possess a high degree of crystallinity are prepared by controlling the total alkali metal oxide/water-free clay weight ratio within the range of 0.95 to 7.4, and added SiO$_2$/water-free clay weight ratio within the range of 0.01 to 3.8. Products having more than 50 percent crystallinity corresponding to high adsorptive properties are prepared by controlling the total alkali metal oxide/water-free clay weight ratio within the range of 1 to 6.6 and the added SiO$_2$/water-free clay weight ratio within the range of 0.01 to 3.7. For producing a silicate having a high degree of crystallinity, it is desirable that silica or a compound capable of furnishing silica under the reaction conditions be present in the initial high temperature reaction mixture. Such silica may be added from any suitable source The degree of clay conversion can be controlled by the variables above-indicated. Materials ranging from amorphous to highly crystalline alkali metal aluminosilicate may be prepared. Products having a high degree of adsorption as measured by the ability to adsorb above about 11% by weight of cyclohexane are characterized by X-ray analysis as having a major proportion of crystalline aluminosilicate of the X type with some shift, generally, 10 to 40 percent, to the Y structure. The materials having high cyclohexane adsorption were found, upon analysis, to be essentially entirely X-Y type crystalline aluminosilicates. Due to the simplicity of the cyclohexane adsorption test, this parameter has been used herein to characterize present products.

The products obtained as indicated hereinabove may be either amorphous or crystalline alkali metal aluminosilicates. The crystalline alkali metal aluminosilicates have been referred to as molecular sieve zeolites. In accordance with the present process, a major proportion of the alkali metal ions of the alkali metal aluminosilicate produced in either amorphous or crystalline form, as described above, is ion exchanged with at least one ion selected from the group consisting of alkaline earth metals, rare earth metals, ammonium and hydrogen. Suitable replacing ions include, for example, those of the alkaline earth metals such as calcium and magnesium; the rare earth metals, such as cerium, lanthanum, praseodymium, neodymium, samarium and mixtures thereof with each other and the other rare earths; and other ions such as hydrogen or ions capable of conversion to hydrogen, for example, such as ammonium ions or complex ammonium ions. Other suitable replacing ions include those of silver, and the transition metals, including those whose atomic numbers are from 21 to 28, from 39 to 46 and from 72 to 78 inclusive, namely scandium, titanium, vanadium, chromium, manganese, iron, cobalt, nickel, yttrium, zirconium, niobium, molybdenum, ruthenium, rhodium, palladium, palatinum, hafnium, tantalum, tungsten, rhenium, osmium and iridium.

It is also within the purview of the present invention to introduce the foregoing ions into the structure of the resulting crystalline aluminosilicate during the initial high temperature step by including in the reaction mixture a suitable compound of the metal which it is desired to introduce. The resulting product is thereafter dispersed in water and subjected to the digestion treatment described hereinabove.

It is important to note that if the digestion step is carried out under such conditions as to effect conversion of a portion, but not all, of the reactants to crystalline aluminosilicate zeolite, our invention contemplates subjecting the resultant admixture (containing both crystalline aluminosilicate zeolite and residual solid unconverted material) to ion-exchange so as to reduce the alkali metal content, e.g., sodium content, of such admixture to less than about 4%, and desirably to less than about 3% by weight on a dry basis. Such ion-exchanged admixture may then be composited with a suitable inorganic oxide matrix material, the matrix being clay or an amorphous oxide, and thereafter the resulting composite may be formed into discrete catalyst particles.

Alternatively, the ion-exchange step may be deferred until after the admixture of crystalline alumniosilicate zeolite and unconverted residual solid material are composited with the matrix material, and then such composite may be subjected to ion-exchange.

The base exchanged aluminosilicate product may be used directly, i.e., alone, as a catalyst for effecting conversion of hydrocarbons. Alternatively, the base exchanged aluminosilicate may be intimately admixed in finely divided form with a binder therefor under such conditions that the aluminosilicate is distributed throughout and held suspended in a matrix of the binder which may subsequently be dried and calcined. Thus, the catalyst utilized in the present process may, in one embodiment, be prepared by intimately admixing the alkali metal aluminosilicate prepared, as described hereinabove, in finely divided form having a weight mean particle diameter of less than about 40 microns and preferably less than about 15 microns with a suitable binder such as clay or an inorganic oxide gel, base exchanging the resulting composite substantially free of alkali metal by treating with a solution containing at least one ion selected from the group of alkaline earth metals, rare earth metals, ammonium and hydrogen, washing the resulting base exchanged material free of water soluble matter, drying the washed composite and subjecting the same to a thermal activating treatment. Alternatively, the alkali metal aluminosilicate may undergo base exchange, as above, prior to intimate admixture thereof with the binder. In accordance with such manner of operation, the resulting mixture of finely divided previously base exchanged aluminosilicate distributed throughout and held suspended in a matrix of the binder is dried and thermally activated as described hereinabove.

Intimate admixture of the finely divided base exchanged aluminosilicate and binder, such as inorganic oxide hydrogel, may be accomplished, for example, by ball milling the two materials together over an extended period of time preferably in the presence of water under conditions to reduce the particle size of the aluminosilicate to a weight mean particle diameter of less than 40 and preferably less than 15 microns. Such method of admixture, however, is less preferred than that achieved by dispersing the powdered aluminosilicate either before or after drying, in an inorganic oxide hydrosol. Following this procedure, the finely divided aluminosilicate may be dispersed in an already prepared hydrosol or, as is preferable where the hydrosol is characterized by a short time of gelation, the finely divided aluminosilicate may be added to one or more of the reactants used in forming the hydrosol or may be admixed in the form of a separate stream with streams of the hydrosol-forming reactants in a mixing nozzle or other means where the reactants are brought into intimate contact. It is desirable that the aluminosilicate introduced into the hydrosol have a weight mean particle diameter of less than about 40 microns and preferably less than 15 microns, and when large particles are desired between 2 and 7 microns. The use of aluminosilicate having a weight mean particle diameter in excess of 40 mircons gave rise to a physical weak product while the use of aluminosilicate having a weight mean particle diameter of less than 1 micron produced a product of low diffusivity.

The powder-containing inorganic oxide hydrosol sets to a hydrogel lapse of a suitable period of time and the resulting hydrogel is base exchanged, if zeolitic alkali metal has been introduced as a result of employing an alkali metal aluminosilicate, with a solution containing at least one ion selected from the group consisting of alkaline earth metals, rare earth metals, ammonium and hydrogen. The base exchanged product is thereafter dried to a gel and thermally activated at a temperature below the fusion point of the incorporated aluminosilicate powder.

The inorganic oxide gel employed as a matrix for the aluminosilicate powder may be a gel of any hydrous inorganic oxide, for example, aluminous or siliceous gels. While alumina gel or silica gel may be utilized as a suitable matrix, it is preferred that the inorganic oxide gel employed be a cogel of silica and an oxide of at least one metal selected from the group consisting of metals of Groups II–A, III–B, IV–A of the Periodic Table. Such components include, for example, silica-alumina silica-magnesia, silica-zirconia, silica-thoria, silica-beryllia, silica-titania, as well as ternary combinations such as silica-alumina-thoria, silica-alumina-zirconia, silica-alumina-magnesia and silica-magnesia-zirconia. Particular preference is accorded cogels of silica-alumina, silica-zirconia and silica-alumina-zirconia. In the foregoing gels, silica is generally present as the major component and the other oxides of metals are present in minor proportion. Thus, the silica content of such gels is generally within the approximate range of 55–100 weight percent with the metal oxide content ranging from 0–45 weight percent. The inorganic oxide hydrosols utilized herein and hydrogels obtained therefrom may be prepared by any method well known in the art such as, for example, hydrolysis of ethylortho silicate, acidification of an alkali metal silicate which may contain a compound of a metal, the oxide of which it is desired to cogel with silica. The relative proportions of finely divided aluminosilicate and matrix may vary widely with the aluminosilicate content ranging from about 2 to about 90% by weight and more usually, particularly where the composite is prepared in the form of beads, in the range of about 2 to about 50% by weight of the composite. Other preferred matrices include clays and hydrous alumina prepared by any well known techniques.

The catalytic composition described hereinabove may be prepared in any desired physical form either when utilized in an uncombined form or when intimately composited with a suitable binder as described hereinabove. Thus, the aluminosilicate combined with an inorganic oxide gel may suitably be prepared by initially forming a hydrosol-containing added aluminosilicate powder, permitting the same to set in mass to a hydrogel which is thereafter dried and broken into pieces of desired size. The pieces of gel so obtained are generally or irregular shape. Uniformly shaped pieces of gel may be obtained by extrusion or pelleting of the aluminosilicate containing hydrogel. Also, the hydrosol may be introduced into the perforations of a perforated place and retained therein until the sol has set to a hydrogel, after which the formed hydrogel pieces are removed from the plate. The method of the invention is particularly useful for the production of catalyst in the form of spheroidal particles. The hydrosol-containing powder aluminosilicate may be made into spheroidal particles by any feasible process such as methods described in patents to Marisic, for example, U.S. 2,384,946. Broadly, such methods involve introducing globules of hydrosol into a body of water-immiscible liquid, for example an oil medium, wherein the globules of hydrosol set to a hydrogel and subsequently pass into an underlying layer of water from which they are sluiced to further processing operations such as base exchange, water washing, drying and calcining. Larger size spheres are ordinarily within the range of from about $\frac{1}{16}$ to about $\frac{1}{4}$ inch in diameter, whereas small size spheres, which are generally referred to as microspheres, are within the range of from about 10 to about 100 microns in diameter. The use of the spherodically shaped particles is of particular advantage in hydrocarbon conversion processes, including the moving catalyst bed processes, the fluidized processes, etc. in which the spheroidal gel particles are subjected to continuous movement. As applied to the stationary bed, spheroidal catalyst particles provide effective contact of the reactants and the catalyst by avoiding channeling. It is accordingly a preferred embodiment of the invention to prepare the described catalyst in the form of spheres, although it is to be realized that the method of the invention may also be employed in obtaining a mass of catalyst which may thereafter be broken up into particles of desired size. Likewise, the method described herein may be used for the preparation of the present catalysts in the form of particles or any other desired size or shape.

While for the production of spheroidal catalyst particles by the aforementioned technique, initial formation of a hydrosol which sets upon lapse of a short interval of time to an all-embracing bead-form hydrogel is essential, it is within the purview of this invention to also employ particularly where the catalyst is prepared in a form other than the spheroidal shape, a matrix comprising a gelatinous hydrous oxide precipitate with varying degrees of hydration or a mixture of a hydrogel and such gelatinous precipitate. The term gel as utilized herein is intended to include hydrogel, gelatinous precipitates and mixtures of the two. Also, the matrix may consist of or contain as a component thereof a clay and particularly a clay of the montmorillonite or kaolinite families, either raw or acid treated. Other suitable materials for use as the matrix of the present catalyst composition include charcoal, graphite, bauxite, metallic powder, and other binders compatible with the aluminosilicate and thermally stable under the temperature conditions at which the catalyst is used.

The slurry of aluminosilicate resulting from treatment of natural clay, as described above, either in the absence or presence of a matrix-forming material may suitably be formed into very finely divided particles by spray drying. The product so obtained is in fluidized form being made up of particles having a diameter of less than 300 microns. Such product is particularly applicable for use as catalyst in hydrocarbon conversion operations such as the fluid cracking process. It is, in fact, one of the advantages of the present invention that the treatment of natural clay with a caustic-containing solution may be controlled to afford a product of predetermined crystallinity and the slurry resulting from such controlled treatment thereafter be formed into particles of desired size by various techniques such as the formation of beads, microspheres, powder, etc. The slurry of aluminosilicate either with or without a matrix-forming material may be dispersed in the upper part of a chamber or tower through which a current of drying gas is passed. The drying gas, which may be air, is usually supplied in heated conditions generally at a temperature between about 600° F. and 1000° F. to accelerate the rate of drying of the particles. Dispersion may be effected by any well known method such as impinging a stream thereof on to a rapidly rotating disc by forcing it through a nozzle provided with multiple orifices or by spraying through a nozzle designed to impart a high velocity to the slurry and break up into fine particles of relatively uniform size. Contact between the hot gases and the product is maintained for a relatively short interval of time. The slurry prior to spraying usually contains between about 4 and about 10 percent solids. It is generally preferred to disperse the slurry in the form of droplets having a diameter of about 200–400 microns which, on drying, results in a product of about 100–300 microns diameter.

As indicated hereinabove, the alkali metal aluminosilicate prepared by the specified treatment of natural clay may undergo base exchange either before or after intimate admixture thereof with the binder therefor. Base exchange is effected by treatment with a solution containing alkaline earth metal ions, rare earth metal ions, ammonium ions, hydrogen ions or mixtures of one with the other. It is contemplated that any compound capable of ionization to yield one or more of the aforementioned ions may be employed for base exchange. Generally, an aqueous solution of an alkaline earth metal salt, a rare earth metal salt, an acid or an ammonium salt will be employed. Thus, the alkaline earth metal salt may be a chloride, nitrate, formate or acetate of calcium or magnesium. The rare earth metal salt employed may be a chloride, sulfate, nitrate, formate or acetate of cerium, lanthanum, praseodymium, neodymium, samarium and other rare earths as well as solutions containing mixtures of these ions and mixtures of the same with other ions such as ammonium. Weak acid solutions or treatment of the aluminosilicate with an acidic gas serves to effect exchange of the alkali metal with hydrogen ions. Base exchange of the aluminosilicate may also be readily effected with solutions containing ammonium ions to yield ammonium aluminosilicates which, upon heating, result in the hydrogen form of the aluminosilicate. Another effective method of exchange is to replace more than about 70 percent of the alkali metal ion by contact with a solution of alkaline earth metal ions, rare earth metal ions or rare earth metal and ammonium ions, followed by completing the alkali metal exchange to less than about 3 percent, preferably less than about 2 percent, residual exchangeable alkali metal content with ammonium ion exchange.

The exchangeable alkali metal content of the finished catalyst should be less than about 3 and preferably less than about 2 percent by weight. The base exchange fluid may be contacted with the aluminosilicate in the form of a fine powder, a compressed pellet, extruded pellet, spheroidal bead or other suitable particle shape. It has been found that the desired base exchange may be effected most readily if the alkali metal aluminosilicate undergoing treatment has not previously been subjected to a temperature above about 600° F.

Base exchange required for introducing the necessary replacing ions is carried out for a sufficient period of time and under appropriate temperature conditions to replace at least about 70 percent of the alkali metal originally contained in the aluminosilicate and to reduce the exchangeable alkali metal content of the resulting composite to below about 3 weight percent and preferably less than about 2 weight percent.

While water will ordinarily be the solvent in the base exchange solutions employed, it is contemplated that other solvents, although generally less preferred, may be used. Thus, in addition to aqueous solution, alcoholic solutions, etc. of suitable compounds as noted above may be employed in producing the catalyst utilized in the present process. It will be understood that compounds employed for the base exchange solution undergo ionization in the particular solvent used.

The concentration of compound employed in the base exchange solution may vary depending on the nature of the particular compound used, on the alkali metal aluminosilicate undergoing treatment and on the conditions under which treatment is effected. The overall concentration of replacing ion, however, is such as to reduce the exchangeable alkali metal content of the original alkali metal aluminosilicate to less than about 3% and preferably less than about 2% by weight on a dry basis. Generally, the concentration of compound, the cation of which replaces alkali metal from the alkali metal aluminosilicate, is within the range of 0.2 to 30% by weight, although, as noted hereinabove, other solution concentrations may be employed providing the exchangeable alkali metal content is reduced to less than about 3, preferably less than 2% by weight, and still more desirably to below 1% by weight.

The temperature at which base exchange is effected may vary widely, generally ranging from room temperature to an elevated temperature below the boiling point of the treating solution. While the volume of base exchange solution employed may vary widely, generally an excess is employed and such excess is removed from contact with the aluminosilicate after a suitable period of contact. The time of contact between the base exchange solution and aluminosilicate in any instance is such as to effect replacement of the alkali metal ions thereof to an extent such that the exchangeable alkali metal content of the composite after undergoing base exchange is less than 3% by weight. It will be appreciated that such period of contact may vary widely depending on the temperature of the solution, the nature of the alkali metal aluminosilicate used and the particular compound employed for base exchange. Thus, the time of contact may extend from a brief period of the order of a few minutes for small particles to longer periods of the order of days for large pellets.

After base exchange treatment, the product is removed from the treating solution. Anions introduced as a result of treating with the base exchange solution may, if desired or necessary, be removed by water washing the dried composite for such period of time until the same is free of said anions. The washed product is then dried, generally in air to remove substantially all of the water therefrom. While drying may be effected at ambient temperature, it is more satisfactory to facilitate the removal of moisture by maintaining the product at a temperature between about 150 and about 600° F. for 4 to 48 hours.

The dried material is then subjected to calcination by heating in an inert atmosphere, i.e. one which does not adversely effect the catalyst such as air, steam, nitrogen, hydrogen, flue gas, helium or other inert gas. Generally, the dried material is heated in air to a temperature in the approximate range of 500° F. to 1500° F. for a period of at least about one hour and usually between about 1 and 48 hours. The catalyst is also improved by treating with steam either in place of or subsequent to the calcination step. Such steam treatment is feasibly carried out at temperatures between about 800 and 1500° F. at steam concentrations greater than about 5% for a time sufficient to reduce the catalyst surface area by at least 20% but not more than about 75%.

Cracking, utilizing the catalyst described herein, may be carried out at catalytic cracking conditions employing a temperature within the approximate range of 500 to 1200° F. and under a pressure ranging from subatmospheric pressure up to several hundred atmospheres. The contact time of the hydrocarbon charge with the catalyst is adjusted in any case according to the conditions, the particular oil feed and the particular results desired to give a substantial amount of cracking to lower boiling products. Cracking may be effected in the presence of the instant catalyst utilizing well-known techniques including, for example, those wherein the catalyst is employed as a fluidized mass or as a compact particle-form moving bed.

The cracking activity of the catalyst is a measure of its capacity to catalyze conversion of hydrocarbons and is expressed herein as the percentage conversion of a Mid-Continent Gas Oil having a boiling range of 450 to 950° F. to gasoline having an end boiling point of 410° F. by passing vapors of said gas oil through the catalyst at 875° F. to 900° F., substantially atmospheric pressure and a feed rate of 1.5 to 8 volumes of liquid oil per volume of catalyst per hour for 10 minute runs between regenerations.

It has been found desirable in analyzing the results obtained with the catalyst described herein to compare the same with those realized with a conventional commercial silica-alumina gel cracking catalyst containing approximately 10% by weight alumina. The exceptional activity and selectivity of the present catalyst are emphasized by comparison of the various product yields obtained with such catalyst with yields of the same products given by the conventional silica-alumina catalyst at the same conversion level. The differences (Δ values) shown hereinafter represent the yields given by the present catalyst minus the yields given by the conventional catalyst.

The following examples will serve to further illustrate our invention. Examples 1–35 relate to the last described second embodiment of our invention, while Examples 36–75 illustrate the first embodiment.

Example 1

Dixie clay used in this preparation is kaolinite having the following composition: 44.51 wt. percent $Al_2O_3$, 38.51 wt. percent $SiO_2$, 1.27 wt. percent $Fe_2O_3$, 1.47 wt. percent $TiO_2$, 0.08 wt. percent CaO, 0.12 wt. percent MgO, 0.08 wt. percent $Na_2O$ and 0.22 wt. percent $K_2O$.

One thousand (1000) grams of the above clay were mixed in a blender with 2600 grams NaOH pellets containing 77.5 wt. percent $Na_2O$, 1000 grams of water and 1840 grams N-Brand sodium silicate containing 8.8 wt. percent $Na_2O$, 28.5 wt. percent $SiO_2$ and 62.7 wt. percent $H_2O$. The resulting wet slurry was placed in a furnace at 600° F. and held for 4 hours permitting the temperature of the slurry to increase from room temperature to 600° F.

The product which formed was a hard crusty solid. This material was ball-milled to a particle size of less than about 60 mesh (Tyler). The ground material was then contacted with 6500 cc. of water and ball milled for an additional 4 hours. The resulting slurry was divided into three equal parts and diluted with an additional 7707 cc. of water each.

This slurry was digested in a water bath at 200° F. for 20 to 24 hours. After digestion, the supernatant liquid was separated from the resulting activated clay by filtration and the filter cake combined from the three diluted portions was washed free of water-soluble matter.

The activated clay, as wet cake, contained 42.2 weight percent solids (as determined by drying a sample at 230° F.). Cyclohexane adsorption capacity of the dried sample amounted to 5.7 weight percent. By X-ray analysis, the clay was shown to be mainly amorphous possessing only a small amount of crystalline character.

The activated clay, so obtained, was incorporated into a silica-alumina hydrogel matrix in bead form as follows:

A. Silicate solution (1)

| | Lbs. |
|---|---|
| N-Brand sodium silicate | 15.75 |
| Water | 7.95 |

(2)

Clay slurry

| | Lbs. |
|---|---|
| Activated clay slurry | 4.05 |
| Water | 5.62 |

The above two solutions were mixed together forming the slurry-silicate solution having a specific gravity at 76° F. of 1.195.

B. Acid solution

| | Lbs. |
|---|---|
| Water | 57.10 |
| $Al_2(SO_4)_3 \cdot 18H_2O$ | 4.23 |
| $H_2SO_4$ (97.6%) | 1.98 |

Specific gravity at 80° F. of 1.051.

Solutions A and B were mixed together in a mixing nozzle at a rate of 390 cc./min. for Solution A and 386 cc./min. for Solution B to yield a hydrosol having a pH of 8.1 to 8.6. The resulting hydrosol was introduced in the form of globules into a body of water-immiscible liquid in which they set to beads of hydrogel in 2.8 seconds at a temperature of 64° F. The composition of the resulting hydrogel beads, on a calcined salt-free basis, was 25.3 weight percent activated clay, 4.6 weight percent alumina and remainder silica.

The bead hydrogel, so obtained, was base exchanged with a 2 percent by weight aqueous solution of a mixture of rare earth metal chlorides, continuously for 24 hours using the equivalent of 12 (2 hour) changes with ½ volume of solution per volume of beads. The approximate composition of the rare earth metal chloride mixture utilized for base exchange was:

| | Weight, percent |
|---|---|
| $LaCl_3 \cdot 6H_2O$ | 23 |
| $CeCl_3 \cdot 6H_2O$ | 43.5 |
| $PrCl_3 \cdot 6H_2O$ | 5.4 |
| $NdCl_3 \cdot 6H_2O$ | 17.9 |
| $SmCl_3 \cdot 6H_2O$ | 1.9 |
| $GdCl_3 \cdot 6H_2O$ | 0.6 |
| Other rare earth chloride hexahydrates | 0.2 |

Plus small amounts of salts of Th, Ca, Mg, Na and Al, as well as some silica.

The base exchanged bead hydrogel was then water washed free of soluble chlorides, dried in air at 270° F. for 24 hours, tempered 10 hours at 1000° F. in air and finally stabilized in two ways, i.e. by treatment with steam for 20 hours at 1225° F. and atmospheric pressure and by treating with steam for 30 hours at 1200° F. and a pressure of 15 p.s.i.g.

The finished catalyst had a sodium content of 0.66 weight percent, a rare earth metal oxide content of 16 weight percent and had a surface area after the 20 hour steam treat at 1225° F. with steam at atmospheric pressure of 208 square meters per gram.

Example 2

The catalyst of this example was prepared in a manner identical with that of Example 1 except that instead of base exchanging the bead hydrogel obtained with a 2 weight percent solution of rare earth metal chlorides, base exchange was carried out with a combined solution containing 1 weight percent rare earth metal chloride and 1 weight percent ammonium chloride. The base exchanged material was thereafter washed, dried, tempered and steam treated as in Example 1.

The finished catalyst of this example had a sodium content of 0.56 weight percent, a rare earth metal oxide content of 8.2 weight percent and possessed a surface area after the 30 hour steam treat at 1200° F. with steam at 15 p.s.i.g. of 104 square meters per gram.

Catalytic evaluation of the catalysts of Examples 1 and 2 is hereinafter summarized in Table I. Referring more particularly to such table, it will be seen that these catalysts containing the caustic-silicate activated clay, even though mainly in an amorphous condition, are more active than catalysts of Example A which was a standard silica-alumina cracking catalyst or Example B which was a catalyst similar to that of Example A but base exchanged with the rare earth metal chloride mixture. The activity advantage was about +5 volume percent conversion at 4 liquid hourly space velocity for the catalyst of Example 1 and about +8 volume percent conversion for the catalyst of Example 2. Both of these catalysts were more selective, affording a +4.9 and a +2.6 volume percent $C_5+$ gasoline advantage over the standard silica-alumina catalyst. More severe steam treat of 30 hours at 1200° F. and 15 p.s.i.g. decreased the selectivity advantage with the catalyst of Example 1 and increased the selectivity advantage with the catalyst of Example 2 to +3.5 $C_5+$ gasoline advantage over standard silica-alumina catalyst.

Example 3

The catalyst of this example was prepared in the same manner as that of Example 1 except that the Dixie clay was activated to a greater degree, yielding activated clay which had a cyclohexane adsorption of 10 weight percent corresponding to a crystallinity of about 42 percent.

The Dixie clay was activated as follows: For each of eight batches of 125 grams of Dixie clay, 187.5 grams NaOH containing 77.5% $Na_2O$, 125 grams of water and 230 grams N-Brand sodium silicate containing 28.5 wt. percent $SiO_2$, 8.8 wt. percent $Na_2O$ and 62.7 wt. percent $H_2O$ were mixed with vigorous agitation. Batches of the slurry were placed in a furnace at 600° F. and held for 4 hours permitting the temperature of the slurry to increase from room temperature to 600° F. The fused material so obtained was blended with 1500 cc. of water for approximately 2 minutes and then diluted to 8000 cc. with water and digested for 68 hours at 200° F. The activated clay slurry was filtered and water washed free of soluble matter. The total yield of wet cake from the eight batches was 5.14 pounds having a solids content of 60.25 percent (as determined by drying a sample at a temperature of 230° F.).

The activated clay, prepared as above, was used in the preparation of the present catalyst in a manner identical with that of Example 1 by introducing in a silica-alumina bead hydrogel matrix, base exchanging with rare earth chloride solution, washing, drying, calcining and treating with 100 percent steam at 15 p.s.i.g. and 1200° F. for 30 hours.

The finished catalyst of this example had a sodium content of 0.52 weight percent, a rare earth metal oxide content of 14.7 weight percent, an alumina content of 12.7 weight percent and a surface area of 161 square meters per gram after the pressure steam treat at 1200° F.

Example 4

Utilizing the Dixie clay activated as in Example 3, the catalyst of this example was prepared in the same manner as that of Example 2 by introducing the activated clay into a silica-alumina bead hydrogel matrix, base exchanging with combined rare earth metal chloride and ammonium chloride solution, washing, drying, calcining and treating with 100 percent steam at 15 p.s.i.g. and 1200° F. for 30 hours.

The finished catalyst of this example had a sodium content of 0.13 weight percent, a rare earth metal oxide content of 11.5 weight percent and a surface area of 147 square meters per gram after the pressure steam treat.

Catalytic evaluation of the catalysts of Examples 3 and 4 using a clay activated to a higher degree with a cyclohexane adsorption of 10 weight percent, exhibited more active and selective cracking than the catalysts of Examples 1 and 2 as will be seen from the data summarized hereinafter in Table I. Thus, the catalyst of Example 4 gave 59.2 volume percent conversion at 4 liquid hourly space velocity compared to 38 volume percent conversion using the catalyst of Example 2. The catalyst of Example 4, it will further be noted, was also very selective affording +6.3 volume percent $C_5+$ gasoline, −1.9 weight percent dry gas and −1.5 weight percent coke in comparison with the standard silica-alumina catalyst. The catalyst of Example 3 affording a 49 volume percent conversion at 4 liquid hourly space velocity was substantially more active than the catalyst of Example 1. The selectivity of the catalyst of Example 3 was also good, showing +3.8 volume percent $C_5+$ gasoline yield, −0.6 weight percent dry gas and −0.4 weight percent coke advantage over the standard silica-alumina catalyst. Comparing the catalyst of Example 4 with that of Example 3, the particular advantage of the combined rare earth metal chloride and ammonium chloride base exchange is evident in both activity and selectivity.

Table I summarizing the foregoing is set forth below:

TABLE I

| | | | Example | | | | | |
|---|---|---|---|---|---|---|---|---|
| | A | B | 1 | 2 | | | 3 | 4 |
| | | | Description Matrix | | | | | |
| | $SiO_2Al_2O_3$ | | $SiO_2\,Al_2O_3$ Dixie Clay Caustic Activated | | | | | |
| Base Exchange: | | | | | | | | |
| Solution | $Al_2(SO_4)_3 \cdot 18H_2O$ | $RECl_3 \cdot 6H_2O$ | $RECl_3 \cdot 6H_2O$ | $RECl_3 + NH_4Cl$ | | | $RECl_3 \cdot 6H_2O$ | $RECl_3 + NH_4Cl$ |
| Conc., wt. percent | 1.5 | | 2 | 1 | 1 | | 2 | 1  1 |
| Composition: | | | | | | | | |
| Na, wt. percent | 0.19 | 0.61 | 0.66 | 0.56 | | | 0.52 | 0.13 |
| $(RE)_2O_3$, wt. percent | | 6.19 | 16.0 | 8.2 | | | 14.7 | 11.5 |
| $Al_2O_3$, wt. percent | 9.37 | | | | | | 12.7 | |
| Steamtreat [1] | SR | SR | SR | SR | SR | SP | SR | SP | SP | SP |
| Physical Properties: | | | | | | | | |
| App. Dense., g./cc | | | | | | | 0.70 | 0.66 |
| Surface Area (after steaming), m.²/g | 206 | 225 | 208 | 104 | | | 161 | 147 |
| Catalytic Evaluation: | | | | | | | | |
| Conversion, vol. percent | 37.9 | 50.1 | 34.2 | 43.9 | 43.2 | 33.3 | 46.3 | 38.0 | 47.6 | 49.0 | 59.2 |
| LHSV | 4 | 2 | 4 | 2 | 4 | 4 | 4 | 4 | 2 | 4 | 4 |
| 10 RVP Gaso., vol. percent | 32.7 | 36.9 | | 36.1 | 41.3 | 31.5 | 40.0 | 36.2 | 41.0 | 43.0 | 51.0 |
| Excess $C_4$'s, vol. percent | 7.4 | 14.8 | | 7.1 | 3.6 | 3.6 | 7.4 | 4.7 | 7.8 | 7.1 | 10.1 |
| $C_5+$ Gasoline, vol. percent | 31.1 | 35.9 | 27.0 | 34.1 | 38.2 | 29.4 | 37.7 | 33.9 | 38.7 | 40.7 | 48.5 |
| Total $C_4$'s, vol. percent | 9.1 | 15.8 | | 9.1 | 6.7 | 5.8 | 9.6 | 7.0 | 10.1 | 9.5 | 12.7 |
| Dry gas, wt. percent | 4.3 | 7.0 | | 5.7 | 3.9 | 3.2 | 4.7 | 3.5 | 5.0 | 5.4 | 5.6 |
| Coke, wt. percent | 1.0 | 2.3 | | 2.3 | 2.0 | 1.3 | 2.6 | 0.5 | 2.2 | 2.2 | 2.9 |
| $H_2$, wt. percent | | | | 0.19 | 0.19 | 0.17 | 0.22 | 0.11 | 0.18 | 0.18 | 0.11 |
| $\Delta$ Values to standard silica-alumina catalyst: [2] | | | | | | | | |
| 10 RVP, vol. percent | | | | 0.0 | +5.6 | +1.5 | +2.5 | +3.5 | +2.7 | +4.0 | +6.5 |
| Excess $C_4$'s, vol. percent | | | | −1.6 | −4.6 | −2.6 | −2.2 | −2.6 | −2.0 | −3.2 | −3.4 |
| $C_5+$ Gasoline, vol. percent | | | | +0.4 | +4.9 | +1.4 | +2.6 | +3.5 | +2.7 | +3.8 | +6.3 |
| Total $C_4$'s, vol. percent | | | | −2.0 | −4.3 | −2.7 | −2.2 | −2.6 | −2.2 | −3.1 | −3.0 |
| Dry Gas, wt. percent | | | | +0.7 | −0.9 | −0.4 | −0.7 | −0.7 | −0.6 | −0.6 | −1.9 |
| Coke, wt. percent | | | | +0.2 | +0.02 | −0.1 | +0.2 | −1.1 | −0.5 | −0.4 | −1.5 |

[1] SR—20 hours at 1,225° F. with 100% atmos. steam; SP—15 p.s.i.g. steam treat at 1,200° F. for 30 hours.

[2] Commercial silica-alumina gel cracking catalyst containing about 10 wt. percent $Al_2O_3$ and remainder $SiO_2$.

Example 5

McNamee clay used in this preparation is a kaolinite having a substantially lower content of iron oxide than Dixie clay. The composition of McNamee clay was as follows: 39.85 wt. percent $Al_2O_3$, 44.99 wt. percent $SiO_2$, 0.35 wt. percent $Fe_2O_3$, 0.73 wt. percent $TiO_2$, 0.12 wt. percent $Na_2O$, 0.10 wt. percent $K_2O$ and traces of CaO and MgO.

Eight batches of the above clay activated with caustic and silica were prepared by mixing for each batch in a blender 125 grams of raw McNamee clay, 187.5 grams NaOH containing 77.5 wt. percent $Na_2O$, 125 grams of water and 230 grams of N-brand sodium silicate containing 28.5 wt. percent $SiO_2$, 8.8 wt. percent $Na_2O$ and 62.7 wt. percent $H_2O$. The resulting wet slurry obtained upon combining 2 batches each was placed in a furnace at 600° F. and held at such temperature for a period of 4 hours.

The product which formed was a hard crusty solid. This material was crushed in a jaw crusher and hammer milled to a fine powder having a particle size of less than about 60 mesh (Tyler). The total yield of dry ground product from the above composites was 5.52 lbs. This material was divided into 4 equal parts consisting of 560 grams each. To each of the divided portions was added 8700 cc. of water. The resulting slurry in each instance was digested at a temperature of 200° F. for 44–48 hours. After digestion, the slurry was filtered and the filter cake was washed free of water-soluble matter.

The activated clay, wet cake, contained 53.2 wt. percent solids. Cyclohexane adsorption capacity of the dried sample amounted to 7.4 wt. percent, corresponding to about 25% crystallinity. By X-ray analysis, the clay was shown to have a crystalline content predominantly of X type zeolites.

The resulting caustic-silicate activated clay was incorporated into a silica-alumina hydrogel matrix in bead form in the same manner as described in Example 1. The resulting silica-alumina bead hydrogel having the finely divided activated clay dispersed therein was thereafter base exchanged with rare earth metal chlorine solution, washed, dried, calcined, as described in Example 1 and then treated with 100% steam at 15 p.s.i.g. and 1200° F. for 24 hours.

The finished catalyst of this example had a sodium content of 0.64 wt. percent, a rare earth metal oxide content of 13.4 wt. percent and a surface area of 163 square meters per gram after the pressure steam treat at 1200° F.

Example 6

Utilizing the McNamee clay activated as in Example 5, the catalyst of this example was prepared in the same manner as that of Example 2 by introducing the activated clay into a silica-alumina hydrogel matrix, base exchanging with combined rare earth metal chloride and ammonium chloride solution, washing, drying, calcining and treating with 100% steam at 15 p.s.i.g. and 1200° F. for 24 hours.

The finished catalyst of this example had a sodium content of 0.21 wt. percent, a rare earth metal oxide content of 9.18 wt. percent and a surface area of 153 square meters per gram after the pressure steam treat.

Example 7

The catalyst of this example was prepared in a manner identical with that of Example 5 down to and including the formation of the silica-alumina bead hydrogel particles having the activated clay dispersed therein. The resulting bead hydrogel was then base exchanged by first contacting the same with ½ volume of a 2% by weight aqueous solution of a mixture of rare earth metal chlorides, having the composition set forth in Example 1 per volume of bead hydrogel, for 16 hours. Thereafter the bead hydrogel was continuously contacted with a 1% by wt. aqueous solution of ammonium chloride for 24 hours using the equivalent of 12 (2 hour) contacts with 1% by wt. aqueous ammonium chloride solution employing ½ volume of solution per volume of bead hydrogel.

The base exchanged bead hydrogel was then water washed free of soluble chlorides, dried in air at 270° F. for 24 hours, calcined 10 hours at 1000° F. in air and thereafter treated with steam for 24 hours at 1200° F. and a pressure of 15 p.s.i.g.

The finished catalyst had a sodium content of 0.18 wt. percent, a rare earth metal oxide content of 6.14 and had a surface area of 128 square meters per gram after the steam treat.

Catalytic evaluation of the catalysts of Examples 5, 6 and 7 is hereinafter summarized in Table II. Referring more particularly to such table, it will be seen that these catalysts, containing the caustic-silicate activated clay, activated to an extent of only 7.4 cyclohexane adsorption afforded upon base exchange with rare earth chloride alone and with mixtures of rare earth chloride and ammonium chloride improved activity and selectivity over the standard catalysts of Examples A and B. The catalyst of Example 6, wherein base exchange was effected with a combined solution of rare earth metal chloride and ammonium chloride and the catalyst of Example 7, wherein base exchange was effected with rare earth metal chloride followed by ammonium chloride possessed similar activities and comparable selectivities over the standard silica-alumina cracking catalyst. The catalyst of Example 5 demonstrates that base exchange with rare earth metal chloride alone afforded a catalytic composite of lower activity than the catalysts of Examples 6 and 7 in which a combined rare earth metal and ammonium chloride base exchange solution was employed. The catalyst of Example 5, however, as will be noted, was characterized by high selectivity.

Example 8

The catalyst of this example was prepared utilizing a McNamee clay of the same composition as employed in Example 5 but caustic-silicate activated to a cyclohexane adsorption capacity of 16 wt. percent corresponding to a crystallinity of approximately 75%.

The specific difference between the caustic-silicate activated clay employed in the catalyst of this example over the clay used in the preparation of the catalyst of Example 5 resided in the method of clay digestion. The clay was initially activated with caustic and silicate as described in Example 5. The resulting hard crusty solid product was then crushed and ground to a fine powder having a particle size of less than 60 mesh (Tyler). The powdered product was thereafter initially contacted with agitation for 2 minutes with an equal weight of water. Thereafter water was added to the extent of 13.4 grams per gram of activated clay and the resulting dilute mixture was digested for 44 hours at a temperature of 200° F. The activated clay so treated was then filtered and water washed free of soluble matter. The predigestion step employed in activating the clay utilized in this example was responsible for the increased cyclohexane adsorption and crystallinity.

The highly crystalline clay so obtained was incorporated into a silica-alumina hydrogel matrix in bead form in the same manner as employed in the preparation of the catalyst of Example 1. The activated clay constituted 25% by weight of the resulting composite.

The bead hydrogel so obtained was base exchanged continuously for two periods of 24 hours each with a 2% by weight aqueous solution of a mixture of rare earth metal chlorides having the composition set forth in Example 1. Such exchange was equivalent to 24 (2 hour) contacts with ½ volume of 2 wt. percent rare earth metal chloride solution per volume of bead hydrogel. The base exchanged bead hydrogel was then water washed free of soluble chlorides, dried in air at 270° F., tempered 10 hours at 1000° F. in air and finally treated with 100% steam for 24 hours at 1200° F. and a pressure of 15 p.s.i.g.

The finished catalyst had a sodium content of 0.44 wt. percent, a rare earth metal oxide content of 13.9 wt. percent and had a surface area of 209 square meters per gram after steam treat.

Example 9

Utilizing the McNamee clay activated as in Example 8, the catalyst of this example was prepared in the same manner as that of Example 6 by introducing the activated clay into a silica-alumina hydrogel matrix, base exchanging with combined rare earth metal chloride and ammonium chloride solution, washing, drying, calcining and treating with steam.

The finished catalyst of this example had a sodium content of 0.22 wt. percent, a rare earth metal oxide content of 7.6 wt. percent, an alumina content of 12 wt. percent and a surface area of 205 square meters per gram after the steam treat.

Example 10

Utilizing the McNamee clay activated as in Example 8, the catalyst of this example was prepared in the same manner as that of Example 7 including base exchange, water washing, drying, tempering and steam treating.

The finished catalyst of this example had a sodium content of 0.33 wt. percent, a rare earth metal oxide content of 7.81 wt. percent and a surface area of 194 square meters per gram after the steam treat.

Catalytic evaluation of the catalysts of Examples 5 to 10 is hereinafter summarized in Table II. It will be seen by reference to such table that the catalysts of these examples exhibit improved activity and selectivity over the standard silica-alumina cracking catalyst. Catalytic data for the catalyst of Example 8 show that rare earth metal chloride base exchange alone affords a less active and selective catalyst than the rare earth metal-ammonium combined exchange. Thus, the activity was 9 volume percent conversion lower and selectivity was 3.4 volume percent $C_5+$ gasoline less than that obtained with the combined rare earth metal-ammonium chloride exchange. However, the catalyst of Example 8 shows the particular advantage of the more active clay component in that the catalyst of Example 8 was about 20 volume percent more active than the catalyst of Example 5.

Table II summarizing the foregoing is set forth below:

TABLE II

| | Example | | | | | |
|---|---|---|---|---|---|---|
| | 5 | 6 | 7 | 8 | 9 | 10 |
| | Description Matrix | | | | | |
| | $SiO_2/Al_2O_3+25\%$ McNamee Clay Activated to a Cyclohexane Adsorption Capacity of 7.4 Wt. Percent | | | $SiO_2/Al_2O_3+25\%$ McNamee Clay Activated to a Cyclohexane Adsorption Capacity of 16 Wt. Percent | | |
| Base Exchange: | | | | | | |
| Solution | $RECl_3$ | $RECl_3+NH_4Cl$ | $RECl_3 \rightarrow NH_4Cl$ | $RECl_3$ | $RECl_3+NH_4Cl$ | $RECl_3 \rightarrow NH_4Cl$ |
| Conc., wt. percent [3] | 2 | 1    1 | 2    1 | 2 | 1    1 | 2    1 |
| Composition: | | | | | | |
| Na, wt. percent | 0.64 | 0.21 | 0.18 | 0.44 | 0.22 | 0.33 |
| $(RE)_2O_3$, wt. percent | 13.4 | 9.18 | 6.14 | 13.9 | 7.6 | 7.81 |
| $Al_2O_3$, wt. percent | | | | | 12 | |
| Steam treat [1] | SP | SP | SP | SP | SP | SP |
| Physical Properties: | | | | | | |
| App. Dens., g./cc | 0.59 | | 0.59 | 0.63 | 0.60    0.60 | 0.61    0.61 |
| Surface Area (after steaming), m.²/g | 163 | 153 | 128 | 209 | 205    205 | 194    194 |
| Catalytic Evaluation: | | | | | | |
| Conversion, vol. percent | 38.3 | 50.7 | 51.4 | 58.1 | 67.1    56.7 | 66.4    55.7 |
| LHSV | 4 | 4 | 4 | 4 | 4    4 | 4    8 |
| 10 RVP Gaso., vol. percent | 36.4 | 45.9 | 46.9 | 49.5 | 57.8    52.2 | 56.9    51.5 |
| Excess $C_4$'s, vol. percent | 4.7 | 8.2 | 8.2 | 10.1 | 10.8    8.2 | 11.5    8.2 |
| $C_5+$ Gasoline, vol. percent | 34.3 | 43.5 | 44.4 | 47.2 | 55.1    49.4 | 54.4    48.7 |
| Total $C_4$'s, vol. percent | 6.8 | 10.6 | 10.7 | 12.4 | 13.5    11.0 | 14.1    11.0 |
| Dry Gas, wt. percent | 3.3 | 4.5 | 4.4 | 5.9 | 7.6    4.9 | 7.0    4.8 |
| Coke, wt. percent | 1.3 | 1.6 | 1.5 | 3.2 | 3.1    1.6 | 2.8    1.4 |
| $H_2$, wt. percent | 0.05 | 0.05 | 0.03 | 0.04 | 0.04    0.02 | 0.03    0.01 |
| Δ Values to standard silica-alumina catalyst: [2] | | | | | | |
| 10 RVP, vol. percent | +3.5 | +5.9 | +5.9 | +5.5 | +9.6    +8.9 | +8.9    +8.8 |
| Excess $C_4$'s, vol. percent | −2.7 | −2.6 | −2.8 | −3.0 | −5.9    −4.4 | −4.5    −4.1 |
| $C_5+$ Gasoline, vol. percent | +3.8 | +5.7 | +6.4 | +5.5 | +8.9    +8.4 | +8.6    +8.2 |
| Total $C_4$'s, vol. percent | −2.9 | −2.4 | −2.6 | −2.9 | −5.2    −3.9 | −4.3    −5.6 |
| Dry Gas, wt. percent | −0.9 | −1.7 | −1.9 | −1.4 | −1.4    −2.2 | −1.7    −2.0 |
| Coke, wt. percent | −0.3 | −1.4 | −1.6 | −1.0 | −2.7    −2.4 | −2.9    −2.4 |

[1] SP-15 p.s.i.g. steam treat at 1,200° F. for 24 hours.
[2] Commercial silica-alumina gel cracking catalyst containing about 10 wt. percent $Al_2O_3$ and remainder $SiO_2$.
[3] Where $RECl_3$ is used the conc. is calculated as $RECl_3 \cdot 6H_2O$.

Examples 11–13

The catalysts of Examples 11, 12 and 13 were prepared in a manner identical with that of the catalysts of Examples 8, 9 and 10 respectively except that only 10% by weight of the activated clay component was used rather than 25% by weight.

Example 14

The catalyst of this example was prepared in a manner identical with that of Example 8 except that base exchange was carried out with a 2% by weight aqueous solution of lanthanum chloride instead of the mixed rare earth chloride solution.

Catalytic evaluation of the catalysts of Examples 11–14 is summarized hereinafter in Table III. Referring to such table, it will be seen that the catalysts of Examples 11, 12 and 14 have similar activities, 59–62 volume percent conversion at 4 liquid hourly space velocity and similar selectivities +6.0 to +6.3 volume percent $C_5+$ gasoline advantage over the standard silica-alumina catalyst. The most selective of this group of catalysts was that of Example 13 which was base exchanged in two steps, initially with a 2% by weight aqueous solution of rare earth metal chloride for 16 hours followed by a continuous exchange with 1% aqueous solution of ammonium chloride. The selectivity advantage of the clay component was approximately 1.7 vol percent $C_5+$ gasoline advantage over a silica-alumina catalyst containing approximately 10% by weight of sodium aluminosilicate which had undergone base exchange with a mixture of rare earth metal chloride and ammonium chloride. These data show particularly the advantage of the activated clay material over the use of pure sodium aluminosilicate material.

Table III summarizing the foregoing is set forth below:

Example 15

The catalyst of this example was prepared in a manner identical with that of Example 11 except that base exchange was effected initially with a 2% by weight aqueous solution of lanthanum chloride for 16 hours followed by a continuous exchange with a 1% aqueous solution of ammonium chloride.

The finished catalyst of this example had a sodium content of 0.03 wt. percent, a rare earth metal oxide content of 6.4 wt. percent and a surface area of 178 square meters per gram after steam treatment.

Example 16

The catalyst of this example was prepared in a manner identical with that of Example 12 except that base exchange of the bead hydrogel was effected with a combined solution of 1% by weight lanthanum chloride and 1% by weight ammonium chloride.

The finished catalyst of this example had a sodium content of 0.25 wt. percent, a rare earth metal oxide content of 7.81 wt. percent, an alumina content of 8.48 wt. percent and a surface area of 1.76 square meters per gram after steam treatment.

Catalytic evaluation of the above catalysts was carried out and the results are hereinafter summarized in Table IV. The catalytic evaluation data for the catalyst of Example 15 when compared with that for the catalyst of Example 13 shows that the catalyst of Example 15, i.e. the lanthanum base exchanged catalyst was somewhat more active than the catalyst of Example 13 wherein base exchange was carried out with a combined solution of rare earth metal chloride and ammonium chloride. Likewise, the catalyst of Example 15 is somewhat more selective than the catalyst of Example 13. The catalyst of both of the above examples showed an appreciable improvement in activity and in selectivity over that obtained with the standard silica-alumina catalyst.

Example 17

This example illustrates that a matrix of silica alone may be used in the preparation of active and selective catalysts. The catalyst preparation was essentially the same as that employed utilizing a silica-alumina matrix except that in this example the silicate solution containing the caustic-silicate activated clay was gelled only with

TABLE III

| Example | 11 | 12 | 13 | 14 |
|---|---|---|---|---|
| Description Matrix | $SiO_2/Al_2O_3$+10% Activated McNamee Clay | | | |
| Base Exchange: | | | | |
| Solution | $RECl_3$ | $RECl_3+NH_4Cl$ | $RECl_3$   $NH_4Cl$ | $LaCl_3$ |
| Conc., wt. percent [3] | 2 | 1     1 | 2     1 | 2 |
| Composition: | | | | |
| Na, wt. percent | 0.18 | 0.15 | 0.03 | 0.20 |
| $(RE)_2O_3$, wt. percent | 10.6 | 5.3 | 5.68 | 10.6 |
| $Al_2O_3$, wt. percent | | 10.2 | | |
| Steam treat [1] | SP | SP | SP | SP |
| Physical Properties: | | | | |
| App. Dens., g./cc | 0.85 | 0.79 | 0.78 | 0.79 |
| Surface Area (after steaming), m.²/g | 195 | 178 | 163 | 206 |
| Catalytic Evaluation: | | | | |
| Conversion, vol. percent | 59.0 | 61.8 | 62.3 | 59.3 |
| LHSV | 4 | 4 | 4 | 4 |
| 10 RVP Gaso., vol. percent | 50.6 | 52.1 | 53.9 | 51.3 |
| Excess, $C_4$'s, vol. percent | 10.0 | 11.0 | 11.8 | 9.7 |
| $C_5+$ Gasoline, vol. percent | 48.1 | 49.6 | 51.5 | 48.6 |
| Total $C_4$'s, vol. percent | 12.6 | 13.6 | 14.2 | 12.4 |
| Dry Gas, wt. percent | 6.3 | 7.2 | 6.0 | 6.1 |
| Coke, wt. percent | 2.6 | 2.2 | 2.3 | 2.4 |
| $H_2$, wt. percent | 0.06 | 0.05 | 0.02 | 0.02 |
| Δ Values to standard silica-alumina catalyst: [2] | | | | |
| 10 RVP, vol. percent | +6.3 | +6.4 | +7.9 | +6.8 |
| Excess $C_4$'s, vol. percent | −3.5 | −3.4 | −2.9 | −3.9 |
| $C_5+$ Gasoline, vol. percent | +6.0 | +6.1 | +7.7 | +6.3 |
| Total $C_4$'s, vol. percent | −3.0 | −3.0 | −2.6 | −3.3 |
| Dry Gas, wt. percent | −1.2 | −0.8 | −2.1 | −1.5 |
| Coke, wt. percent | −1.8 | −2.6 | −2.7 | −2.0 |

[1] SP—15 p.s.i.g. steam treat at 1,200° F. for 24 hours.
[2] Commercial silica-alumina gel cracking actalyst containing about 10 wt. percent $Al_2O_3$ and remainder $SiO_2$.
[3] Rare earth chloride concentration calculated as $RECl_3.6H_2O$.

a sulfuric acid solution. The catalyst was prepared by mixing the following solutions:

A. Silicate solution (1)

| | Lbs. |
|---|---|
| N-Brand silicate | 16.5 |
| Water | 5.62 |

(2)

Clay slurry

| | Lbs. |
|---|---|
| Water | 5.63 |
| Activated clay slurry (47.7% solids) | 1.33 | obtained upon caustic-silicate activation of McNamee clay to 16 wt. percent cyclohexane adsorption.

The above two solutions were mixed together forming the slurry-silicate solution having a specific gravity at 74° F. of 1.214.

B. Acid solution

| | Lbs. |
|---|---|
| Water | 27.65 |
| $H_2SO_4$ (97.6%) | 2.94 |

Specific gravity at 113° F. of 1.052.

Solution A flowing at a rate of 460 cc./min. was mixed with Solution B flowing at a rate of 396 cc./min. in a mixing nozzle to yield a hydrosol having a pH of 8.3 to 8.7. The resulting hydrosol was introduced, in the form of globules, into a body of water-immiscible liquid in which it set to beads of hydrogel in 1.6 seconds at 74° F.

The bead hydrogel so obtained was base exchanged initially with one-16 hour contact at room temperature employing a 2% by weight aqueous solution of lanthanum chloride followed by a continuous base exchange for 24 hours with a 1% by weight aqueous solution of ammonium chloride.

The base exchanged bead hydrogel was then water washed free of soluble chlorides, dried in air at 270° F. for 24 hours, tempered 10 hours at 1000° F. in air and finally treated with steam for 24 hours at 1200° F. and a pressure of 15 p.s.i.g.

The finished catalyst had a sodium content of 0.08 wt. percent, a rare earth metal oxide content of 5.35 wt. percent and a surface area after steaming of 328 square meters per gram.

This catalyst was evaluated for catalytic conversion and the results obtained are hereinafter set forth in Table IV. As will be noted, by reference to such table, the catalyst of this example showed a very marked catalytic advantage over standard silica-alumina catalyst of approximately 6 volume percent $C_5+$ gasoline at 43.3 volume percent conversion and a liquid hourly space velocity of 4.

Example 18

The catalyst of this example shows that a silica-rare earth metal oxide matrix may be used in the process of preparing present catalysts with equivalent results obtained with silica-alumina or silica matrices.

The catalyst preparation method was similar to that described in Examples 11-14 but differing in the acid solution to the extent that aluminum sulfate was replaced with lanthanum chloride. Specifically, the catalyst was prepared by mixing the following solutions:

A. Silicate solution (1)

| | Lbs. |
|---|---|
| N-Brand sodium silicate | 14.6 |
| Water | 7.63 |

(2)

Clay slurry

| | Lbs. |
|---|---|
| Water | 6.62 |
| Activated clay slurry (50.7 wt. percent solids) | 1.13 |

Resulting from activation of McNamee clay with caustic-silicate solution to achieve a 16 wt. percent cyclohexane adsorption as described in Example 8.

The above two solutions were mixed together forming the slurry-silicate solution having a specific gravity at 77° F. of 1.182.

B. Acid solution

| | Lbs. |
|---|---|
| Water | 28.5 |
| $H_2SO_4$ (97.6%) | 1.86 |
| $LaCl_3 \cdot 6H_2O$ (45% $La_2O_3$) | 0.415 |

Specific gravity at 78° F. of 1.046.

Solutions A and B were mixed together in a mixing nozzle at a rate of 414 cc./min. for solution A and 424 cc./min. for solution B to yield a hydrosol having a pH of 8.3 to 8.5. The resulting hydrosol was introduced, in the form of globules, into a body of water-immiscible liquid in which it set to beads of hydrogel in 3.1 seconds at a temperature of 69° F.

The bead hydrogel so obtained was base exchanged with a 2% by weight aqueous solution of lanthanum chloride for 16 hours at room temperature and then base exchanged continuously with a 1% aqueous solution of ammonium chloride for 24 hours. The 24 hour continuous base exchange was equivalent to 12-2 hour contacts using ½ volume solution per volume of bead hydrogel. The hydrogel was then washed free of chloride ion, dried in air at 270° F. for 24 hours, tempered in air at 1000° F. for 10 hours and thereafter treated with steam for 24 hours at 1200° F. and 15 p.s.i.g.

The finished catalyst had a sodium content of 0.05 wt. percent, a rare earth metal oxide content of 9.01 wt. percent, an alumina content of 3.01 wt. percent and a surface area, after the steam treatment, of 324 square meters per gram.

Catalytic evaluation of this catalyst was carried out and is hereinafter summarized in Table IV. It will be seen by reference to such table that the silica-lanthanum oxide matrix affords an active and quite selective cracking catalyst. Thus, such catalyst afforded a +7.9 volume percent $C_5+$ gasoline, −2.2 wt. percent dry gas and −1.8 wt. percent coke advantage over a standard silica-alumina cracking catalyst.

Example 19

The catalyst of this example illustrates the particular catalytic advantage of the silica-lanthnum oxide matrix containing 10% by weight of the activated clay when the drogel was prepared in the same manner as that dedrogen was prepared in the same manner as that described in Example 18, except that the pH was lower. The resulting bead hydrogel was processed, activated and steam treated in a manner identical with that described for the catalyst of Example 18.

The finished catalyst had a sodium content of 0.03 wt. percent, a rare earth metal oxide content of 6.3 wt. percent, an alumina content of 3.5 wt. percent and a surface area after steaming of 367 square meters per gram.

Catalytic evaluation of this catalyst was carried out and the results obtained are hereinafter summarized in Table IV. Referring to this table, it will be seen that the catalyst was extremely selective showing a +9.2 volume percent $C_5+$ gasoline advantage, −2.1 wt. percent dry gas and −2.6 wt. percent coke advantage over the standard silica-alumina cracking catalyst.

Table IV summarizing the foregoing is set forth below:

TABLE IV

| Example | 15 | 16 | 17 | 18 | 19 |
|---|---|---|---|---|---|
| Description Matrix | $SiO_2/Al_2O_3$+10% Clay | | $SiO_2$+10% Clay | $SiO_2/La_2O_3$+10% Clay | |
| Base Exchange: | | | | | |
| Solution | $LaCl_3 \rightarrow NH_4Cl$ | $LaCl_3 + NH_4Cl$ | $LaCl_3 \rightarrow NH_4Cl$ | $LaCl_3 \rightarrow NH_4Cl$ | $LaCl_3 \rightarrow NH_4Cl$ |
| Conc., wt. percent [3] | 2     1 | 1     1 | 2     1 | 2     1 | 2     1 |
| Composition: | | | | | |
| Na, wt. percent | 0.03 | 0.25 | 0.08 | 0.05 | 0.03 |
| $(RE)_2O_3$, wt. percent | 6.4 | 7.81 | 5.35 | 9.01 | 6.3 |
| $Al_2O_3$, wt. percent | | 8.48 | | 3.01 | 3.5 |
| Steamtreat [1] | SP | SP | SP | SP | SP |
| Physical Properties: | | | | | |
| App. Dens., g./cc | 0.79 | 0.82 | 0.50 | 0.51 | 0.57 |
| Surface Area (after steaming), m.²/g | 178 | 176 | 328 | 324 | 367 |
| Catalytic Evaluation: | | | | | |
| Conversion, vol. percent | 65.6 | 63.1 | 43.3 | 52.4 | 58.6 |
| LHSV | 4 | 4 | 4 | 4 | 4 |
| 10 RVP Gaso., vol. percent | 56.3 | 53.9 | 42.0 | 49.1 | 54.9 |
| Excess $C_4$'s, vol. percent | 12.6 | 11.7 | 4.9 | 6.9 | 5.7 |
| $C_5$+ Gasoline, vol. percent | 53.8 | 51.4 | 39.5 | 46.5 | 51.2 |
| Total $C_4$'s, vol. percent | 15.0 | 14.3 | 7.4 | 9.6 | 9.4 |
| Dry Gas, wt. percent | 6.2 | 6.5 | 3.3 | 4.6 | 5.3 |
| Coke, wt. percent | 2.6 | 2.3 | 0.9 | 1.5 | 1.7 |
| $H_2$, wt. percent | 0.04 | 0.04 | 0.01 | 0.02 | 0.03 |
| Δ Values to standard silica-alumina catalyst: [2] | | | | | |
| 10 RVP, vol. percent | +8.7 | +7.5 | +6.2 | +8.1 | +10.7 |
| Excess $C_4$'s, vol. percent | −3.0 | −3.3 | −3.8 | −4.4 | −7.6 |
| $C_5$+ Gasoline, vol. percent | +8.4 | +7.2 | +6.0 | +7.9 | +9.2 |
| Total $C_4$'s, vol. percent | −3.4 | −2.7 | −3.6 | −4.0 | −6.1 |
| Dry Gas, wt. percent | −2.5 | −1.7 | −1.7 | −2.2 | −2.1 |
| Coke, wt. percent | −3.0 | −2.9 | −1.1 | −1.8 | −2.6 |

[1] SP—15 p.s.i.g. steam treat at 1,200° F. for 24 hours.
[2] Commercial silica-alumina gel cracking catalyst containing about 10 wt. percent $Al_2O_3$ and remainder $SiO_2$.
[3] Rare earth chloride concentration calculated as $RECl_3 \cdot 6H_2O$.

The following Examples 20–23 demonstrate the particular high catalytic activity and selectivity possible with the undiluted clay activated to a varying degree of crystallinity and thereafter base exchanged with rare earth metals and ammonium chloride solutions forming rare earth acid aluminosilicates.

Example 20

Dixie clay was activated as described in Example 1 to yield a product having a cyclohexane adsorption capacity of 5.7 wt. percent. The clay was shown by X-ray analysis to be mainly amorphous.

The activated clay was base exchanged continuously for 48 hours at 180° F. with an aqueous solution containing 5% by wt. of the rare earth metal chloride mixture described in Example 1 and 2% by wt, of ammonium chloride. Such continuous base exchange is equivalent to 24 (2 hour) changes with ½ volume of solution per volume of slurry. The base exchanged clay was thereafter water washed free of chloride ion, air dried at 270° F. for 24 hours, tempered 10 hours at 1000° F. in air and then stabilized by steam treating first at 1225° F. for 20 hours and atmospheric pressure, followed by a 30 hour steam treat at 1200° F. at a pressure of 15 p.s.i.g.

The finished catalyst had a sodium content of 0.30 wt. percent, and a rare earth metal oxide content of 27.2 wt. percent.

Catalytic evaluation data hereinafter set forth in Table V show that marked advantages over standard silica-alumina cracking catalysts are realized by activating the clay by caustic-silicate fusion and subsequent digestion followed by base exchanging with a rare earth metal-ammonium chloride solution. Thus, the catalyst of Example 20 afforded a 40 volume percent conversion at a liquid hourly space velocity of 10 and a conversion of 47 volume percent at a liquid hourly space velocity of 4. In addition, this catalyst showed selectivity advantages of +4.1 and +3.2 volume percent $C_5$+ gasoline over standard silica-alumina cracking catalyst at the same conversions. The standard silica-alumina catalyst (Example A) at a liquid hourly space velocity of 4 provided only 37.9 volume percent conversion of the charge stock.

Example 21

The catalyst of this example was prepared in the same manner as that of Example 20 except that the Dixie clay was activated as described in Example 3 to a greater degree having a cyclohexane adsorption of 10 wt. percent and a crystallinity of about 42%.

The activated clay was base exchanged, washed, dried, tempered and steam treated for 30 hours at a temperature of 1200° F. and a pressure of 15 p.s.i.g.

The finished catalyst had a sodium content of 0.27 wt. percent, a rare earth metal oxide content of 24 wt. percent and had a surface area after the steam treatment of 221 square meters per gram.

Catalytic evaluation data obtained with this catalyst are hereinafter set forth in Table V. These data show that a high catalytic activity and selectivity were realized with this rare earth metal-ammonium chloride exchanged activated clay. Thus, this catalyst afforded 55.4 volume percent conversion at a liquid hourly space velocity of 16. At this high liquid hourly space velocity the catalyst also showed +7.8 volume percent $C_5$+ gasoline advantage over the standard silica-alumina cracking catalyst. The improvement noted with the catalyst of this example over that of Example 20 would appear to be attributable to the increase in crystallinity of the activated clay employed.

Example 22

McNamee clay was activated as described in Example 5 to yield a product having a cyclohexane adsorption capacity of 7.4 wt. percent, corresponding to about 25% crystallinity.

The activated clay was base exchanged with a rare earth metal chloride-ammonium chloride solution, washed, dried and tempered as described in Example 20, and thereafter steam treated for 24 hours at 1200° F. at a pressure of 15 p.s.i.g.

The finished catalyst of this example had a sodium content of 0.21 wt. percent, a rare earth metal oxide content of 25.3 wt. percent and a surface area of 226 square meters per gram after the steam treat at 1200° F.

Catalytic evaluation of this catalyst, as will be seen from the data hereinafter set forth in Table V, showed a high activity of 51.1 volume percent conversion at a liquid hourly space velocity of 16 and a good selectivity of +6.4 volume percent $C_5$+ gasoline, −1.8 wt. percent dry gas and −1.6 wt. percent coke advantage over the standard silica-alumina cracking catalyst.

Example 23

The catalyst of this example was prepared in the same manner as that of Example 22 except that the clay employed was caustic-silicate activated to a cyclohexane adsorption capacity of 16 wt. percent corresponding to a crystallinity of approximately 75%.

The activated clay was then base exchanged with rare earth metal-ammonium chloride solution, washed, dried and tempered as described in Example 20 and thereafter treated with steam for 24 hours at 1200° F. and a pressure of 15 p.s.i.g.

The finished catalyst had a sodium content of 0.53 wt. percent, a rare earth metal oxide content of 24.1 and a surface area after the steam treatment of 392 square meters per gram.

Catalytic evaluation data obtained with this catalyst are hereinafter summarized in Table V. It will be seen by reference to such data that this catalyst possessed properties quite similar to those of the catalyst of Example 21 prepared with an activated Dixie clay. Thus, at a liquid hourly space velocity of 16, the catalyst of the present example afforded 61.3 volume percent conversion and a +7.1 volume percent $C_5+$ gasoline, −2.3 wt. percent dry gas and a −1.0 wt. percent coke advantage over the standard silica-alumina cracking catalyst in the same conversion.

Table V summarizing the foregoing is set forth below:

tivated clay into a silica-alumina matrix. The activated clay in this case was a Halloysite clay (36.91 wt. percent $Al_2O_3$, 51.76 wt. percent $SiO_2$, 0.1 wt. percent $Fe_2O_3$, 1.39 wt. percent $Na_2O.K_2O$ and 13.5 wt. percent loss on ignition) which was activated in a manner similar to the McNamee clay used in the previous examples having high cyclohexane adsorption.

In this case 500 grams raw Halloysite clay was mixed with 1000 grams NaOH (77.5 wt. percent $Na_2O$), 920 grams N-Brand silicate (28.5 wt. percent $SiO_2$, 8.8% $Na_2O$) and 500 cc. water in a blendor. This slurry was then charged to a furnace at 600° F. and held for 4 hours. The resulting frit was ground to <60 mesh, mixed with 1200 g. water for 2 minutes and then diluted with 13,500 cc. water. The diluted slurry was then digested at 200° F. for 21 hours. The final product had high crystallinity as shown by the 17.5 wt. percent cyclohexane adsorption.

This highly crystalline material was incorporated into a silica-alumina gel matrix and processed as described in Table VI.

Example 24 was prepared by base exchanging only with $NH_4Cl$. The catalytic data show low activity but good selectivity.

Examples 25 and 26 demonstrate that the crystalline

TABLE V

| Example | 20 | 21 | 22 | 23 |
|---|---|---|---|---|
| Description | Activated Clay | Activated Clay | | |
| Base Exchange: | | | | |
| Solution | $RECl_3+NH_4Cl$ | $RECl_3+NH_4Cl$ | | |
| Conc., wt. percent | 5     2 | 5     2 | | |
| Composition: | | | | |
| Na, wt. percent | 0.30 | 0.27 | 0.21 | 0.53 |
| $(RE)_2O_3$, wt. percent | 27.2 | 24.0 | 25.3 | 24.1 |
| Steamtreat [1][2][3] | SR20        SP30 | | SP30 | SP24 | SP24 |
| Physical Properties: | | | | |
| App. Dens., g./cc | | | 0.54 | 0.50 |
| Surface Area (after steaming), m.²/g | | 221 | 226 | 392 |
| Catalytic Evaluation: | | | | |
| Conversion, vol. percent | 40.3        47.2 | | 55.4 | 51.1 | 61.3 |
| LHSV | 10        4 | | 16 | 16 | 16 |
| 10 RVP Gaso., vol. percent | 38.4        41.2 | | 50.9 | 46.9 | 53.3 |
| Excess $C_4$'s, vol. percent | 4.8        7.4 | | 7.8 | 7.4 | 9.4 |
| $C_5+$ Gasoline, vol. percent | 35.9        38.8 | | 48.2 | 44.4 | 50.5 |
| Total $C_4$'s, vol. percent | 7.3        9.8 | | 10.6 | 9.9 | 12.4 |
| Dry Gas, wt. percent | 3.5        5.3 | | 4.8 | 4.4 | 5.5 |
| Coke, wt. percent | 1.0        1.8 | | 1.7 | 1.6 | 3.7 |
| $H_2$, wt. percent | 0.03        0.14 | | 0.05 | 0.04 | 0.03 |
| Δ Values to standard silica-alumina catalysts:[4] | | | | |
| 10 RVP, vol. percent | +4.4        +3.1 | | +8.4 | +6.7 | +7.8 |
| Excess $C_4$'s, vol. percent | −3.1        −2.3 | | −4.5 | −3.5 | −4.9 |
| $C_5+$ Gasoline, vol. percent | +4.1        +3.2 | | +7.8 | +6.4 | +7.1 |
| Total $C_4$'s, vol. percent | −2.9        −2.2 | | −4.0 | −3.3 | −4.2 |
| Dry Gas, wt. percent | −1.0        −0.2 | | −2.0 | −1.8 | −2.3 |
| Coke, wt. percent | −0.7        −0.7 | | −2.1 | −1.6 | −1.0 |

[1] SR20 steamtreat 20 hours at 1,225° F. atmospheric steam.
[2] SP30 steamtreat 30 hours at 1,200° F. at 15 p.s.i.g.
[3] SP24 steamtreat 24 hours at 1,200° F. at 15 p.s.i.g.
[4] Commercial silica-alumina gel cracking catalyst containing about 10 wt. percent $Al_2O_3$ and remainder $SiO_2$.

Examples 24–28 demonstrate that halloysite and bentonite clays can be activated by the caustic-silica fusion technique described hereinabove to yield active and selective catalyst when incorporated in a silica-alumina hydrogel.

Examples 24–28

Examples 24, 25 and 26 were prepared in the same manner as Examples 8, 9 and 10 incorporating 10% acproduct made from the caustic fusion of Halloysite clay and incorporation into a silica-alumina matrix followed by base exchange with rare earth and lanthanum yield catalysts having excellent activity and selectivity.

Examples 27 and 28 summarized in Table VI show that Bentonite clay treated in the same manner as described for halloysite can also be converted to active crystalline material having 11.5 wt. percent cyclohexane adsorption and yield effective rare earth and lanthanum catalysts when incorporated in a silica-alumina gel matrix.
Catalytic data are summarized below in Table VI:

TABLE VI

| Example | 24 | 25 | 26 | 27 | 28 |
|---|---|---|---|---|---|
| Description: | | | | | |
| Matrix | $SiO_2/Al_2O_3$ | | | $SiO_2/Al_2O_3$ | |
| Fines: | | | | | |
| Type | Clay Sieve (Halloysite) | | | Clay Sieve (Bentonite) | |
| Conc | 10 | | | 10 | |
| Base Exchange: | | | | | |
| Solution | $NH_4Cl$ | $RECl_3$  $NH_4Cl$ | $LaCl_3$  $NH_4Cl$ | $RECl_3$  $NH_4Cl$ | $LaCl_3$  $NH_4Cl$ |
| Conc., wt. percent | 1 | 2  1 | 2  1 | 2  1 | 2  1 |
| Contacts | 1-24 hr. | (1-16 hr.)  1-24 hr. | (1-16 hr.)  1-24 hr. | 1-16 hr.  1-24 hr. | 1-16 hr.  1-24 hr. |
| Composition: | | | | | |
| Na, wt. percent | 0.5 | 0.08 | 0.08 | 0.2 | 0.1 |
| $(RE)_2O_3$, wt. percent | | 6.08 | 6.82 | 6.07 | 5.66 |
| $Al_2O_3$, wt. percent | 7.67 | | | | |
| Physical Properties: | | | | | |
| App. Dens., g./cc. | 0.82 | 0.74 | 0.70 | | 0.81 |
| Surface Area, m.$^2$/g., Steamed | 129 | 150 | 197 | 145 | 148 |
| sorption Base: Cyclohexane, wt. percent | 17.7 | 17.7 | 17.7 | 11.5 | 11.5 |
| Catalytic Evaluation: | | | | | |
| Conversion, vol. percent | 34.0 | 57.6 | 58.4 | 46.6 | 51.1 |
| LHSV | 4 | 4 | 4 | 4 | 4 |
| 10 RVP Gaso., vol. percent | 29.3 | 50.7 | 49.3 | 41.7 | 44.6 |
| Excess $C_4$'s vol. percent | 6.1 | 10.9 | 11.3 | 7.9 | 8.7 |
| $C_5$+ Gasoline, vol. percent | 27.7 | 48.3 | 47.0 | 39.5 | 42.3 |
| Total $C_4$'s, vol. percent | 7.7 | 13.4 | 13.6 | 10.1 | 10.9 |
| Dry Gas, wt. percent | 3.8 | 5.3 | 6.3 | 4.3 | 5.4 |
| Coke, wt. percent | 1.01 | 1.7 | 2.0 | 1.5 | 1.5 |
| Δ advantage Over Std. Cracking Catalyst:[1] | | | | | |
| 10 RVP, vol. percent | +1.3 | +7.0 | +5.3 | +4.0 | +4.5 |
| Excess $C_4$'s, vol. percent | −0.4 | −2.1 | −1.9 | −1.7 | −2.3 |
| $C_5$+ Gasoline, vol. percent | +2.3 | +6.8 | +5.2 | +4.2 | +4.5 |
| Total $C_4$'s, vol. percent | −1.1 | −1.7 | −1.0 | −1.7 | −2.3 |
| Dry Gas, wt. percent | +0.3 | −2.0 | −1.1 | −1.2 | −0.8 |
| Coke, wt. percent | −0.4 | −2.5 | −2.3 | −0.9 | −1.6 |

[1] Commercial silica-alumina gel cracking catalyst containing about 10 wt. percent $Al_2O_3$ and remainder $SiO_2$.

The following examples will serve to demonstrate that preexchanged activated clay can be incorporated in a silica-alumina matrix in the same manner as the sodium form in Examples 11–14. The method of pre-exchange eliminates the need for rare earth exchange of the hydrogel.

The activated clay used in this case was prepared in the same manner as described in Examples 8–10. This product was base exchanged employing seven 2 hour contacts of a 5 percent by weight lanthanum chloride ($LaCl_3 \cdot 6H_2O$) solution. One liter of such solution per pound of wet cake was employed at a temperature of 180° F. The exchanged product contained 2.17 wt. percent sodium.

The final silica-alumina hydrogel containing 10 wt. percent activated clay pre-exchanged with lanthanum chloride was prepared in a manner exactly analogous to that of Example 11. This product was then exchanged with 1% $NH_4Cl$ solution (Example 29) or with a 1% $(NH_4)_2SO_4$ (Example 30). The latter ammonium exchange was continuous over a 24 hour period at room temperature, using a total solution equivalent of twelve 2 hour contacts with one half volume of solution per volume of bead hydrogel. The catalyst was further washed, dried, calcined and steamtreated in the same manner as Examples 5–7.

As shown by the catalytic data given in Table VII, these catalysts are both very active and very selective.

TABLE VII

| Example Number | 29 | 30 |
|---|---|---|
| Description: | | |
| Matrix | $SiO_2/Al_2O_3$ | |
| Fines: Type | Clay Sieve Pre-Exchanged with $LaCl_3.6H_2O$ | |
| Base Exchange: | | |
| Solution | $NH_4Cl$ | $(NH_4)_2SO_4$ |
| Conc., wt. percent | 1 | 1 |
| Contacts | 1-24 hour continuous | |
| Composition: | | |
| Na, wt. percent | 0.1 | 0.4 |
| $(RE)_2O_3$, wt. percent | 2.45 | 2.53 |
| $Al_2O_3$, wt. percent | | 8.79 |
| Steam Treat | 24 hours at 1,200° F. with 100% steam at 15 p.s.i.g. | |
| Physical Properties: Surface Area, m.$^2$/g., Steamed | 162 | 167 |
| Catalytic Evaluation: | | |
| Conversion, vol. percent | 60.4 | 52.1 |
| LHSV | 4 | 4 |
| 10 RVP Gaso., vol. percent | 51.6 | 46.6 |
| Excess $C_4$'s, vol. percent | 12.2 | 9.6 |
| $C_5$+ Gasoline, vol. percent | 49.2 | 44.3 |
| Total $C_4$'s, vol. percent | 14.5 | 11.9 |
| Dry Gas, wt. percent | 5.9 | 5.1 |
| Coke, wt. percent | 1.9 | 1.4 |
| $H_2$, wt. percent | 0.03 | 0.02 |
| Δ Advantage Over Std. Cracking Catalyst:[1] | | |
| 10 RVP, vol. percent | +6.6 | +5.9 |
| Excess $C_4$'s, vol. percent | −1.8 | −1.6 |
| $C_5$+ Gasoline, vol. percent | +6.4 | +5.8 |
| Total $C_4$'s, vol. percent | −1.5 | −1.6 |
| Dry Gas, wt. percent | −1.8 | −1.2 |
| Coke, wt. percent | −2.7 | −1.8 |

[1] Commercial silica-alumina gel cracking catalyst containing about 10 wt. percent $Al_2O_3$ and remainder $SiO_2$.

The following examples will serve to demonstrate that other hydrous oxides or siliceous matrices can be used to prepare highly active and highly selective clay sieve catalysts.

The activated clay used in these preparations was prepared in the same manner as that used in Examples 8–10. The activated clay was first continuously base exchanged with an aqueous solution containing 5 percent by weight rare earth metal chlorides and 2 percent by weight ammonium chloride at 180° F. using 60 pounds of solution for 1.5 pounds of wet cake over a 48 hour period. The exchanged activated clay was then water washed free of chloride ion, filtered, and then used in the preparation of the following catalysts.

Example 31

The catalyst of this example was prepared by blending the activated clay with raw Florida kaolin clay as a slurry, for a final composition of 10 percent by weight exchanged clay sieve and 90 percent by weight Florida kaolin clay.

The catalyst was prepared by mixing 20 grams of the exchanged clay sieve wet cake (60% solids at 1000° F.) with 213 grams of Florida clay slurry (50.8 wt. percent solids at 1000° F.) with an addition of 50 cc. of water in a blender for 10 minutes. The blended slurry was then dried at 230° F. in air, pelleted and sized 4–10 mesh, calcined for 10 hours at 1000° F. and steam treated for 24 hours at 1200° F. with 15 p.s.i.g. steam.

The final catalyst had a surface area of 48 m.²/g.

Example 32

This example was prepared in the same manner as Example 31 except the clay used as matrix was dried McNamee clay. In this example, 20 grams of the exchanged clay sieve was blended with 123 grams McNamee clay (88% solids at 1000° F.) and 150 cc. of water. The resulting slurry was dried, pelleted, calcined, and steam treated in the same manner as Example 31.

The final steamed catalyst had a surface area of 50 m.²/g.

Example 33

The catalyst of this example was prepared in the same manner as Example 31 except the matrix was hydrous alumina. In this example, 59 grams of exchanged clay sieve (60% solids at 1000° F.) was blended with 118 grams of hydrous alumina (85% solids at 1000° F.) along with 200 cc. of water. The final catalyst composition was 25 weight percent exchanged clay and 75 weight percent alumina. The slurry blend was dried, pelleted, sized, calcined and steam treated in the same manner as Example 31.

The final catalyst analyzed 0.11 weight percent sodium, and 5.74 weight percent rare earth metal oxide. The surface area of the steamed catalyst was 160 m.²/g.

Catalytic data summarized in Table VIII show that the above composites are active and selective cracking catalysts.

TABLE VIII

| Example | 31 | 32 | 33 |
|---|---|---|---|
| Description: | | | |
| Matrix | EPK Clay | McNamee Clay | Al$_2$O$_3$ |
| Fines: | | | |
| Type | Clay Sieve converted to REHX | | |
| Conc. | 10 | 10 | 25 |
| Steam Treat. | 24 hours at 1,200° F. with 15 p.s.i.g. steam | | |
| Composition: | | | |
| Na, wt. percent | | | 0.11 |
| (RE)$_2$O$_3$, wt. percent | | | 5.74 |
| Physical Properties: | | | |
| App. Dens., g./cc | 0.81 | 0.77 | 0.66 |
| Surface Area, m.²/g., Steamed | 48 | 50 | 160 |
| Catalytic Evaluation: | | | |
| Conversion, vol. percent | 57.7 | 54.4 | 43.8 |
| LHSV | 4 | 4 | 4 |
| 10 RVP Gaso., vol. percent | 51.2 | 48.5 | 42.1 |
| Excess C$_4$'s, vol. percent | 8.4 | 7.1 | 6.0 |
| C$_5$+ Gasoline, vol. percent | 48.3 | 45.8 | 39.3 |
| Total C$_4$'s, vol percent | 11.4 | 9.8 | 3.2 |
| Dry Gas, wt. percent | 5.7 | 5.7 | 4.1 |
| Coke, wt. percent | 2.2 | 2.4 | 1.6 |
| H$_2$, wt. percent | 0.11 | 0.14 | 0.16 |
| Δ Advantage over Std. Cracking Catalyst: [1] | | | |
| 10 RVP, vol. percent | +7.5 | +6.5 | +6.1 |
| Excess C$_4$'s, vol. percent | −4.6 | −4.9 | −5.6 |
| C$_5$+ Gasoline, vol. percent | +6.7 | +6.0 | +5.6 |
| Total C$_4$'s, vol. percent | −3.8 | −4.3 | −5.0 |
| Dry Gas, wt. percent | −1.6 | −1.0 | −0.9 |
| Coke, wt. percent | −2.0 | −2.0 | −0.5 |

[1] Commercial silica-alumina gel cracking catalyst containing about 10 wt. percent Al$_2$O$_3$ and remainder SiO$_2$.

The following examples serve to demonstrate catalysts prepared by dispersing caustic-silicate activated clay into a gel matrix and base-exchanging with solutions containing alkaline earth metal ions.

Example 34

The activated clay component was prepared in the same manner as Example 5.

The resulting caustic-silicate activated clay was incorporated into a silica-alumina hydrogel matrix in bead form in the same manner as described in Example 1. The activated clay constituted 10% by weight of the resulting composite.

The bead hydrogel so obtained was base exchanged continuously for 24 hours with an aqueous solution containing 2 weight percent of calcium chloride and 1 weight percent of ammonium chloride. The base exchanged bead hydrogel was then water washed free of soluble chlorides, dried in air at 270° F. for 20 hours, tempered 10 hours at 1000° F. in air and finally treated with 100% steam for 20 hours at 1225° F. and atmospheric pressure.

The finished catalyst had a sodium content of 0.08 wt. percent, a calcium content of 2.7 wt. percent, an alumina content of 9.8 wt. percent and a surface area of 234 square meters per gram.

Example 35

The catalyst of this example was prepared in the same manner as that described in the preceding example except that the hydrogel was base exchanged with a 2 weight percent aqueous solution of magnesium chloride continuously for 24 hours. The base-exchanged hydrogel was then water washed, dried, calcined and steamed as in Example 34.

The finished catalyst had a sodium content of 0.41 wt. percent and a magnesium content of 1.9 wt. percent. After steam treating at 1225° F. for 20 hours with 100% steam at atmospheric pressure, the catalyst product had a surface area of 197 square meters per gram.

Catalytic evaluation of the catalysts of Examples 34 and 35 is hereinafter summarized in Table IX. It will be seen by reference to such table that the catalysts of these examples exhibit improved activity and selectivity over the standard silica-alumina cracking catalyst. Table IX summarizing the foregoing is set forth below:

TABLE IX

| Example | 34 | 35 |
|---|---|---|
| Description: | | |
| Matrix | $SiO_2/Al_2O_3$ | |
| Fines: | | |
| Type | Clay Na/Al/Si | |
| Conc. | 10 | 10 |
| Base Exchange: | | |
| Solution | $CaCl_2+NH_4Cl$ | $MgCl_2$ |
| Conc., wt. percent | 2   1 | 2 |
| Contacts | 1-24 hr. continuous | |
| Composition: | | |
| Na, wt. percent | 0.08 | 0.41 |
| Ca, wt. percent | 2.7 | |
| Mg, wt. percent | | 1.9 |
| $Al_2O_3$, wt. percent | 9.8 | |
| Physical Properties: | | |
| App. Dens., g./cc | 0.75 | 0.84 |
| Surface Area, $m.^2/E.$, Steamed | 234 | 197 |
| Catalytic Evaluation: | | |
| Conversion, vol. percent | 54.3 | 53.4 |
| LHSV | 4 | 4 |
| 10 RVP Gaso., vol. percent | 45.6 | 47.3 |
| Excess $C_4$'s, vol. percent | 10.9 | 8.9 |
| $C_5+$ Gaso., vol. percent | 43.4 | 44.8 |
| Total $C_4$'s, wt. percent | 13.1 | 11.4 |
| Dry Gas, wt. percent | 5.6 | 4.8 |
| Coke, wt. percent | 2.5 | 2.0 |
| $H_2$, wt. percent | 0.10 | 2.16 |
| Δ Advantage Over Std. Cracking Catalyst:[1] | | |
| 10 RVP, vol. percent | +3.6 | +5.8 |
| Excess $C_4$'s, vol. percent | −1.0 | −2.7 |
| $C_5+$ Gasoline, vol. percent | +3.7 | +5.7 |
| Total $C_4$'s, vol. percent | −1.0 | −2.4 |
| Dry Gas, wt. percent | −1.1 | −1.7 |
| Coke, wt. percent | −1.0 | −1.4 |

[1] Commercial silica alumina gel cracking catalyst containing about 10 wt. percent $Al_2O_3$ and remainder $SiO_2$.

Figure 5:
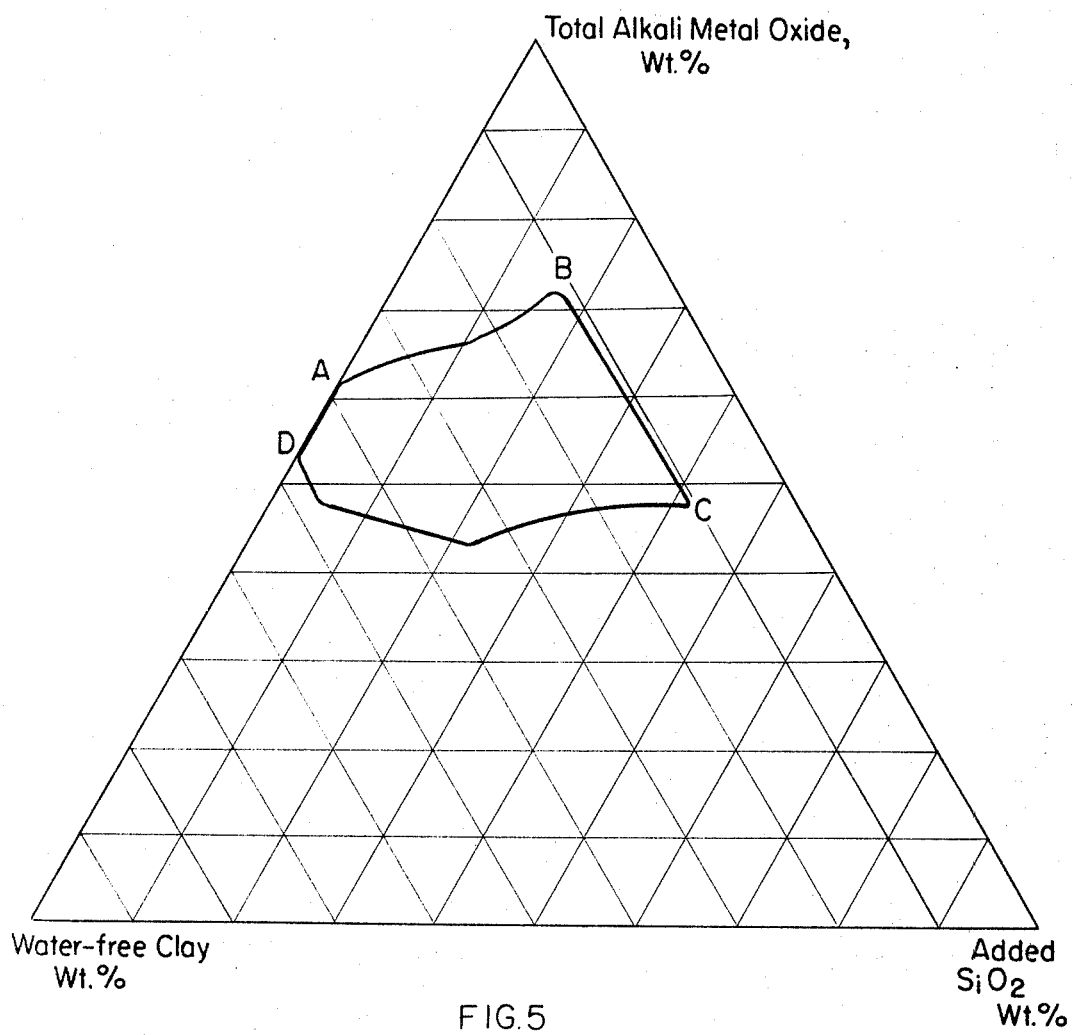
FIG. 5 is a ternary diagram showing a desirable relationship between total alkali metal oxide, water-free clay, and added silica in a reaction mixture made in accordance with our invention, those proportions of reactants resulting in a composition mixture falling within the area ABCD being proportions capable of producing products of a highly crystalline nature.

As indicated hereinabove, the degree of clay conversion can be controlled by adjustment in the ratios of total alkali metal oxide/water-free clay, silica/water-free clay and water/total alkali metal oxide during the initial high temperature step and the subsequent digestion step. Products ranging from amorphous to highly crystalline alkali metal aluminosilicates may be prepared depending upon the above indicated variables. Numerical limits on the above ratios have been specified hereinabove to afford amorphous or products of low crystallinity to those characterized by a high crystallinity. The relationship between total alkali metal oxide, water-free clay and added silica in the reaction mixture is more particularly shown in FIG. 5. To obtain products of a highly crystalline nature, it has been established that the proportions of the reactants are such that the composition mixture falls within the area ABCD of FIG. 5.

The following examples further illustrate that aspect of our invention wherein a raw clay may be converted, in whole or in part, by appropriate treatment of the clay with alkali, to crystalline aluminosilicate.

Example 36

Dixie clay used in this preparation is a kaolinite having the following composition: 44.51 wt. percent $Al_2A_3$, 38.51 wt. percent $SiO_2$, 1.27 wt. percent $Fe_2O_3$, 1.47 wt. percent $TiO_2$, 0.08 wt. percent CaO, 0.12 wt. percent MgO, 0.08 wt. percent $Na_2O$, 0.22 wt. percent $K_2O$, 13.41 wt. percent loss at 1100° F.

Fifty (50) grams of the above clay were mixed in a blendor with 100 grams NaOH containing 77.5 wt. percent $Na_2O$, 50 cc. of water and 92 grams N-Brand sodium silicate containing 8.8 wt. percent $Na_2O$, 28.5 wt. percent $SiO_2$, and 62.7 wt. percent $H_2O$. The resulting wet slurry was placed in a furnace at 600° F. and held for 4 hours permitting the temperature of the slurry to increase from room temperature to 600° F.

The product which formed was a hard crusty solid. This material was ground to a particle size of less than 60 mesh (Tyler). The ground material was then contacted with water using 1 gram of water per gram of solid for about 2 minutes while being vigorously agitated in a blendor. To the resulting slurry was added 1890 cc. of water. The mixture so obtained was agitated for at least about 2 minutes and thereafter contacted for 44 hours at 200° F. in a static state.

The resulting product which settled to the bottom of the digestion vessel was separated from supernatant liquid by decanting, and thereafter filtered and washed. The wet cake so obtained was dried in air at 230° F.

Cyclohexane adsorption data for this product showed 17.3 weight percent adsorption illustrating the same high degree of adsorption characterizing the crystalline sodium aluminosilicate of the X-type. X-ray analysis further showed that the product was about 85% 13X type sodium aluminosilicate having approximately a 15% shift in parameter to the Y type aluminosilicate.

Examples 37–40

The products of these examples were made in the same manner as in Example 36 except that the total caustic to clay weight ratio was varied. Thus, in Example 36, such ratio was 1.71 grams $Na_2O$ per gram of water-free clay. In Examples 37 and 38 the total caustic to water-free clay weight ratio was 1.95 and 2.18 grams $Na_2O$ per gram of clay, respectively. In Examples 39 and 40, the total caustic to water-free clay weight ratio was reduced to 1.33 and 0.94 grams $Na_2O$ per gram of clay, respectively. The data for these examples together with cyclohexane adsorption data for each product are hereinafter summarized in Table X. As will be seen from such data at the silica to clay weight ratio employed (0.525 gram silica/gram of water-free clay), appreciable deviation of the total caustic to clay weight ratio from that employed in Example 36 resulted in products having a lower adsorption capacity for cyclohexane.

Example 41

The product of this example was made in essentially the same manner as in Example 36, but the caustic and silicate were decreased, the $Na_2O$ to clay weight ratio being 0.856 and the $SiO_2$ to clay weight ratio being 0.262. The details of preparation and the cyclohexane adsorption data for this product are hereinafter shown in Table X.

Example 42

The product of this example was made in essentially the same manner as in Example 36, but the silica/clay weight ratio was increased to 1.05 grams $SiO_2$/gram clay. The preparation and cyclohexane adsorption data for this product are hereinafter shown in Table X and indicate that at higher levels of caustic to clay, the silicate to clay weight ratio also has to be increased to maintain a product of high crystallinity.

Example 43

The product of this example was made in essentially the same manner as in Example 36, but with a higher $Na_2O$/clay weight ratio of 3.64 and with a higher $SiO_2$/clay weight ratio of 0.855. As will be seen from the cyclohexane adsorption data obtained and summarized in Table X below, a satisfactory crystalline product was produced.

TABLE X

| Example Number | 36 | 37 | 38 | 39 | 40 | 41 | 42 | 43 |
|---|---|---|---|---|---|---|---|---|
| Fusion: | | | | | | | | |
| Composition: | | | | | | | | |
| Clay: | | | | | | | | |
| Type | | | | Raw Dixie Clay | | | | |
| Wt., g | 50 | 50 | 50 | 50 | 50 | 50 | 50 | 50 |
| Caustic NaOH, g | 100 | 115 | 130 | 75 | 50 | 50 | 130 | 219 |
| Silicate [1] N-Brand, g | 92 | 92 | 92 | 92 | 92 | 46 | 184 | 150 |
| Water, g | 50 | 50 | 50 | 50 | 50 | 50 | 50 | 50 |
| G. ($Na_2O$ (Total))/g. clay | 1.72 | 1.95 | 2.18 | 1.33 | 0.94 | 0.856 | 2.35 | 3.64 |
| G. Added $SiO_2$/g. clay | 0.525 | 0.525 | 0.525 | 0.525 | 0.525 | 0.262 | 1.05 | 0.855 |
| Total Moles $Na_2O$[3]/Total Moles $SiO_2$ | 1.83 | 2.08 | 2.33 | 1.42 | 1.00 | 1.28 | 1.58 | 2.86 |
| Conditions: | | | | | | | | |
| Time, Hrs | 4 | 4 | 4 | 4 | 4 | 4 | 4 | 4 |
| Temp., °F | 600 | 600 | 600 | 600 | 600 | 1,000 | 600 | 600 |
| Predigestion: | | | | | | | | |
| Volume $H_2O$, ml | 125 | 125 | 125 | 125 | 125 | 125 | 125 | 125 |
| Time, Min | 2 | 2 | 2 | 2 | 2 | 2 | 2 | 2 |
| Digestion: | | | | | | | | |
| Volume, $H_2O$, ml | 1,890 | 1,890 | 1,890 | 1,890 | 1,890 | 1,890 | 1,890 | 1,890 |
| Time, Hrs | 44 | 44 | 44 | 44 | 44 | 44 | 44 | 44 |
| Temp., °F | 200 | 200 | 200 | 200 | 200 | 200 | 200 | 200 |
| Cyclohexane Adsorption of Dried [2] Filter Cake, Wt. Percent | 17.3 | 17.2 | 13.3 | 15.5 | 1.1 | 4.9 | 17.8 | 12.1 |

[1] 28.5% $SiO_2$, 8.8% $Na_2O$, 62.7% $H_2O$.
[2] Cake dried 20 hours at 230° F.
[3] Mole ratio including $Na_2O$ in NaOH and N-Brand and $SiO_2$ from N-Brand and clay.

Examples 44–54

The products of these examples were prepared in the same manner as in Example 36 except that the caustic to clay and silica to clay ratios in the reaction mixture were varied. The details of preparation and the cyclohexane adsorption data for each of the resulting products are shown below in Table XI:

Examples 47, 48, 49, 39, 50 and 51 demonstrate the effect of added N-Brand sodium silicate at a lower caustic to clay weight ratio of 1.5 grams NaOH/gram of clay. The added silica, as sodium silicate, was increased from 0 to 1.05 grams/gram of clay showing that at this caustic/clay weight ratio (1.16 grams $Na_2O$/gram of clay) suit-

TABLE XI

| Example Number | 44 | 45 | 38 | 46 | 42 | 47 | 48 | 49 | 39 | 50 | 51 | 52 | 41 | 53 | 54 |
|---|---|---|---|---|---|---|---|---|---|---|---|---|---|---|---|
| Fusion: | | | | | | | | | | | | | | | |
| Composition: | | | | | | | | | | | | | | | |
| Clay: | | | | | | | | | | | | | | | |
| Type | | | | | | | Raw Dixie Clay | | | | | | | | |
| Wt., g | 50 | 50 | 50 | 50 | 50 | 50 | 50 | 50 | 50 | 50 | 50 | 50 | 50 | 50 | 50 |
| Caustic NaOH, g | 130 | 130 | 130 | 130 | 130 | 75 | 75 | 75 | 75 | 75 | 75 | 50 | 50 | 50 | 50 |
| Silicate [1] N-Brand, g | 0 | 46 | 92 | 125 | 184 | 0 | 23 | 46 | 92 | 125 | 184 | 0 | 46 | 92 | 46 |
| Water, g | 50 | 50 | 50 | 50 | 50 | 50 | 50 | 50 | 50 | 50 | 50 | 50 | 50 | 50 | 50 |
| G. $Na_2O$ (Total)/g. Clay | 2.02 | 2.10 | 2.18 | 2.24 | 2.34 | 1.16 | 1.21 | 1.25 | 1.33 | 1.39 | 1.49 | 0.77 | 0.856 | 0.935 | 0.856 |
| G. Added $SiO_2$/g. Clay | 0 | 0.262 | 0.525 | 0.712 | 1.05 | 0 | 0.13 | 0.262 | 0.525 | 0.712 | 1.05 | 0 | 0.262 | 0.524 | 0.262 |
| Total Moles $Na_2O$[3]/Total Moles $SiO_2$ | 5.07 | 3.16 | 2.33 | 1.98 | 1.57 | 2.93 | 2.26 | 1.88 | 1.41 | 1.23 | 1.00 | 1.95 | 1.28 | 1.00 | 1.28 |
| Conditions: | | | | | | | | | | | | | | | |
| Time, Hrs | 4 | 4 | 4 | 4 | 4 | 4 | 4 | 4 | 4 | 4 | 4 | 4 | 4 | 4 | 4 |
| Temp., °F | 600 | 600 | 600 | 600 | 600 | 600 | 600 | 600 | 600 | 600 | 600 | 1,000 | 1,000 | 1,000 | 600 |
| Predigestion: | | | | | | | | | | | | | | | |
| Volume $H_2O$, ml | 125 | 125 | 125 | 125 | 125 | 125 | 125 | 125 | 125 | 125 | 125 | 125 | 125 | 125 | 125 |
| Time, Min | 2 | 2 | 2 | 2 | 2 | 2 | 2 | 2 | 2 | 2 | 2 | 2 | 2 | 2 | 2 |
| Digestion: | | | | | | | | | | | | | | | |
| Volume $H_2O$, ml | 1,890 | 1,890 | 1,890 | 1,890 | 1,890 | 1,890 | 1,890 | 1,890 | 1,890 | 1,890 | 1,890 | 1,890 | 1,890 | 1,890 | 1,890 |
| Time, Hrs | 44 | 44 | 44 | 44 | 44 | 44 | 44 | 44 | 44 | 44 | 44 | 44 | 44 | 44 | 44 |
| Temp., °F | 200 | 200 | 200 | 200 | 200 | 200 | 200 | 200 | 200 | 200 | 200 | 200 | 200 | 200 | 200 |
| Cyclohexane Adsorption Dried Filter Cake,[2] Wt. percent | 2.0 | 1.5 | 13.3 | 15.5 | 17.8 | 6.8 | 12.7 | 15.4 | 15.5 | 10.8 | 1.0 | 1.1 | 4.9 | 1.5 | 2.4 |

[1] 28.5% $SiO_2$, 8.8% $Na_2O$, 62.7% $H_2O$.
[2] Cake dired 20 hours at 230° F.
[3] Mole ratio including $Na_2O$ in NaHO and N-Brand and $SiO_2$ from N-Brand and clay.

The above summarized examples show the effect of the ratio of added silica to clay at fusion conditions for various caustic/clay levels. Thus, the products of Examples 44, 45, 38, 46 and 42 were prepared as in Example 36 except that the added castic to clay weight ratio was held constant at 2.6 grams NaOH per gram of water-free clay, while the amount of added silica was increased from 0 to 0.262, 0.525, 0.712 and 1.05 grams/gram of water-free clay respectively. Silica was added as N-Brand sodium silicate containing 28.5 weight percent $SiO_2$ and 8.8 weight percent $Na_2O$. Cyclohexane adsorption data on the finished products show an increase from 2.0 and 1.5 for Exmaples 44 and 45 to 13.3, 15.5 and 17.8 for Examples 38, 46 and 42 respectively. These data establish that the product quality can be controlled from 1.5 weight percent to 17.8 weight percent cyclohexane adsorption by controlling the added silica to clay weight ratio between 0.26 and 1.05 at a caustic ($Na_2O$) to clay weight ratio of 2.02/1.

able product, having an adsorption capacity for cyclohexane of 6.8 weight percent, was prepared with no added silicate. These data summarized in Table XI show optimum activation at an NaOH/clay weight ratio of 1.5 when between 0.2 and 0.6 gram silica (as silicate) was used per gram of clay.

Examples 52, 41 and 53 show the effect of increased silica utilizing a low caustic/clay weight ratio of 1 gram NaOH/gram of clay. The fusion temperature was increased for these examples to favor further reactivity of the components. Example 41 demonstrates that at the low caustic/clay weight ratio, the optimum silica to clay weight ratio is about 0.26 gram $SiO_2$/gram of clay. However, at these low levels of added caustic and silicate, the product quality, as measured by cyclohexane adsorption, was much lower, i.e. 4.9 weight percent, as compared with 15.4 weight percent when a caustic to clay weight ratio of 1.5 was employed.

The product of Example 54 was prepared in the same manner as Example 41 but at a temperature of 600° F. This lower temperature was insufficient to appreciably activate the clay with the low caustic to clay weight ratio utilized as evident from the lower adsorption of cyclohexane realized with the resulting product.

Examples 55, 56, 57 58, 39, 59, 60, 61, 62, 63, 64 and 65 show the effect of fusion temperature on product quality. The products of these examples were prepared in the same manner as in Example 36 except that the furnace temperature was varied over a range from 230° F. to 1600° F. The details of preparation and the cyclohexane adsorption data obtained with each of the products are shown below in Table XII:

silicate. These samples were digested at 200° F. for 21 hours at various dilutions from 14 moles $H_2O$/mole $Na_2O$ to 263 moles $H_2O$/mole $Na_2O$. These data show that the preferred dilution of the digestion mixture corresponds to about 35 to 180 moles $H_2O$/mole $Na_2O$ and more particularly to about 35 to about 115 moles $H_2O$/mole $Na_2O$ to yield crystalline material of 50 percent or greater crystallinity as measured by X-ray analysis. Also included in FIGURE 3 are data from Example 72 for a crystalline material prepared in the same manner as Example 39 except that sand instead of sodium silicate was used as the source of silica. At the molar dilution of 120 moles of $H_2O$ per mole $Na_2O$, the product resulting from this preparation had a cyclohexane ad-

TABLE XII

| Example Number | 55 | 39 | 56 | 57 | 58 | 59 | 60 | 61 | 62 | 63 | 64 | 65 |
|---|---|---|---|---|---|---|---|---|---|---|---|---|
| Fusion: | | | | | | | | | | | | |
| Composition: | | | | | | | | | | | | |
| Clay: | | | | | | | | | | | | |
| Type | | | | | Raw Dixie Clay | | | | | | Raw McNamee Clay | |
| Wt., g | 50 | 50 | 50 | 50 | 50 | 50 | 50 | 50 | 50 | 50 | 50 | 50 |
| Caustic NaOH, g | 75 | 75 | 75 | 75 | 75 | 75 | 75 | 75 | 75 | 75 | 75 | 75 |
| Silicate [1] N-Brand, g | 92 | 92 | 92 | 92 | 92 | 92 | 92 | 92 | 92 | 92 | 92 | 92 |
| Water, g | 50 | 50 | 50 | 50 | 50 | 50 | 50 | 50 | 50 | 50 | 50 | 50 |
| G. $Na_2O$ (Total)/g. Clay | 1.33 | 1.33 | 1.33 | 1.33 | 1.33 | 1.33 | 1.33 | 1.33 | 1.33 | 1.33 | 1.33 | 1.33 |
| G. Added $SiO_2$/g. Clay | 0.524 | 0.524 | 0.524 | 0.524 | 0.524 | 0.524 | 0.524 | 0.524 | 0.524 | 0.524 | 0.524 | 0.524 |
| Total Moles $Na_2O$ [3]/Total Moles $SiO_2$ | 1.42 | 1.42 | 1.42 | 1.42 | 1.42 | 1.42 | 1.42 | 1.42 | 1.42 | 1.42 | 1.42 | 1.42 |
| Conditions: | | | | | | | | | | | | |
| Time, Hrs | 4 | 4 | 4 | 4 | 4 | 4 | 4 | 4 | 24 | ½ | 72 | 72 |
| Furnace Temp., °F | 450 | 600 | 800 | 800 | 1,000 | 1,200 | 1,400 | 1,600 | 400 | 1,000 | 230 | 350 |
| Predigestion: | | | | | | | | | | | | |
| Volume $H_2O$, ml | 125 | 125 | 125 | 125 | 125 | 125 | 125 | 125 | 125 | 125 | 125 | 125 |
| Time, Min | 2 | 2 | 2 | 2 | 2 | 2 | 2 | 2 | 2 | 2 | 2 | 2 |
| Digestion: | | | | | | | | | | | | |
| Volume $H_2O$, ml | 1,890 | 1,890 | 1,890 | 1,890 | 1,890 | 1,890 | 1,890 | 1,890 | 1,890 | 1,890 | 1,890 | 1,890 |
| Time, Hrs | 44 | 44 | 44 | 44 | 44 | 44 | 44 | 44 | 44 | 44 | 44 | 44 |
| Temp., °F | 200 | 200 | 200 | 200 | 200 | 200 | 200 | 200 | 200 | 200 | 200 | 200 |
| Cyclohexane Adsorption Dried Filter Cake,[2] Wt. Percent | 13.9 | 15.4 | 12.5 | 13.6 | 15.6 | 17.0 | 15.9 | 10.5 | 15.2 | 16.0 | 11.4 | 15 |

[1] 28.5% $SiO_2$, 8.8% $Na_2O$, 62.7% $H_2O$.
[2] Cake dried 20 hours at 230° F.
[3] Mole ratio including $Na_2O$ in NaOH and N-Brand and $SiO_2$ from N-Brand and clay.

The foregoing data show that the minimum temperature is 230° F. when fusing for 72 hours. The product quality determined by cyclohexane adsorption, as will be noted, is essentially constant over the broad range of fusion temperature of 450° F. to 1500° F. Higher temperatures of operation favor shorted contact times. At 1000° F., for example, a ½ hour contact (Example 63) gave comparable results to treatment at 600° F. for 4 hours (Example 39) or at 400° F. for 24 hours (Example 62). At 230 and 350° F., a 72 hour contact time was sufficient to yield desirable product.

Figure 2:
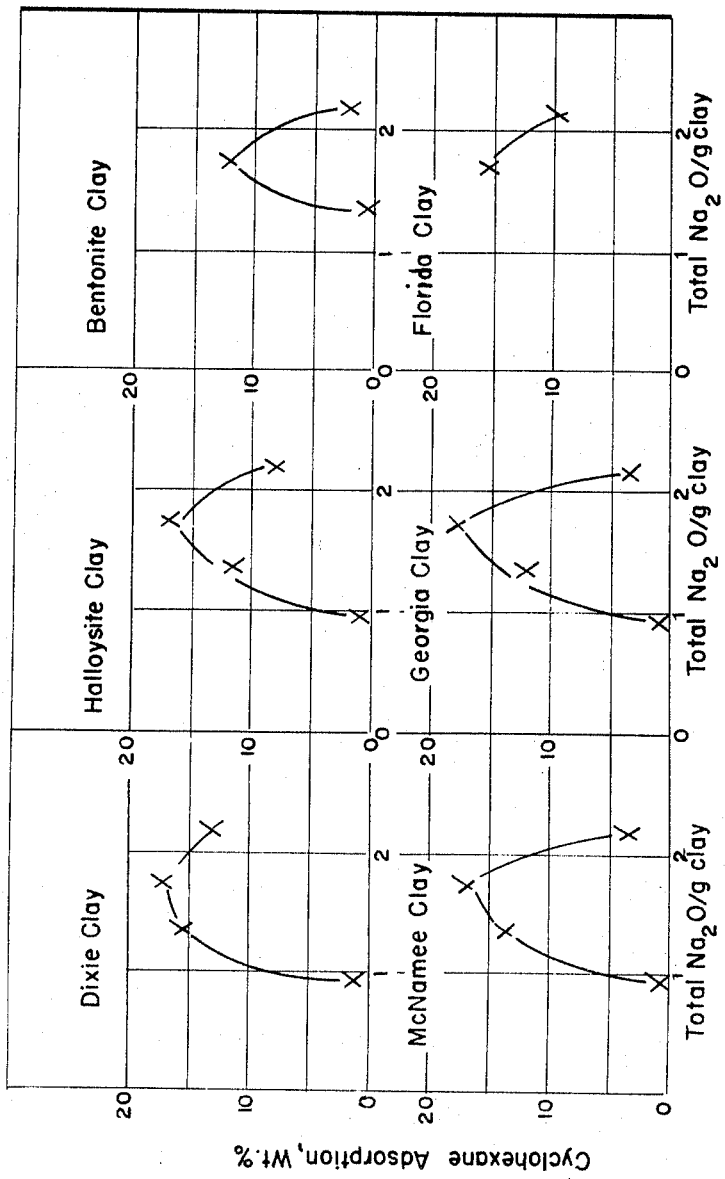
FIG. 2 is a plot of cyclohexane adsorption against total $Na_2O$ content for various clays and illustrates that the method of our invention is broadly applicable to clays in general.

In addition to Dixie clay, various other clays were treated utilizing the procedure of Example 36 including bentonite, halloysite and other kaolinites such as McNamee, Georgia and Florida clays by contacting in each instance a 50 gram sample of the clay with 100 grams NaOH (77.5 wt. percent $Na_2O$), 92 grams of N-Brand sodium silicate and 50 cc. of water. The resulting wet slurry was placed in a furnace at 600° F. and so maintained for 4 hours allowing the temperature of the slurry to increase from room temperature to 600° F. The product obtained in each instance was ground to less than 60 mesh (Tyler) and the finely ground material was contacted for 44 hours at 200° F. utilizing a dilution of 40.2 grams of water per gram of clay. The product so obtained, in each instance, was filtered, washed and dried in air at 230° F. Cyclohexane adsorption data were obtained for each of the products. The data summarized in FIGURE 2 show that the present method is broadly applicable to clays in general. The optimum activation conditions, as will be noted, was at approximately the same total caustic/clay weight ratio of 1.72 grams $Na_2O$ per gram of clay regardless of whether the clay was bentonite (montmorillonite), halloysite or the kaolinite type as Dixie, McNamee, Georgia or Florida clay.

The effect of total $Na_2O$ concentration in the digestion mixture is shown in FIGURE 3. Examples 66–71 from which such data were obtained were carried out in the same manner as Example 39, reacting 50 grams of clay with 75 grams NaOH and 92 grams N-Brand sodium sorption of 12.6, showing that sources of silica other than sodium silicate are feasible for use in the method of this invention.

Figure 4:
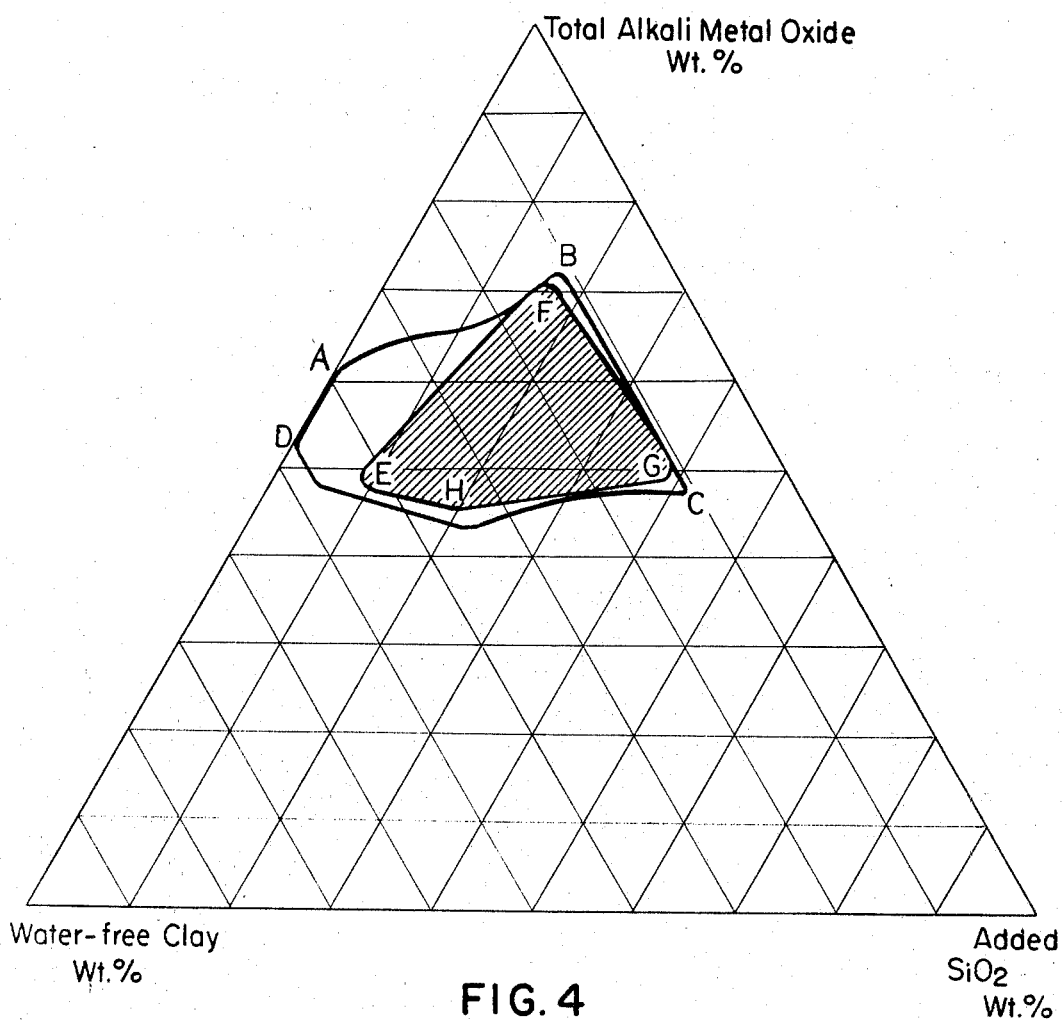
FIG. 4 is a ternary diagram showing a desirable relationship between total alkali metal oxide, water-free clay, and added silica in a reaction mixture made in accordance with our invention, those reactant compositions falling within the region ABCD resulting in sodium aluminosilicate products having crystal patterns of the X and Y type and having a cyclohexane adsorption above about 11% and crystallinity above about 50%, and those reactant compositions falling within the region EFGH resulting in X and Y sodium aluminosilicates having a cyclohexane adsorption of at least about 16% and a crystallinity of at least about 80%.

The foregoing data establish limits on the binary ratios of reactants. Since such ratios are interdependent one upon the other, the actual composition of the initial reaction mixture employed in the present method are summarized in FIGURE 4. Such tenary diagram shows the limits in terms of the weight percent of water-free clay, sodium oxide and added silica. Such were defined by the cyclohexane adsorption properties of the products obtained. The permissable composition limits are defined by the area ABCD of FIGURE 4. Such includes sodium aluminosilicate products having crystal patterns of the X and Y type and having cyclohexane adsorption above about 11 percent and crystallinity above about 50 percent. The preferred region of compositions for at least about 80 percent crystallinity having a cyclohexane adsorption of at least about 16 weight percent fall within the area defined as EFGH.

The following example serves to demonstrate that collodial silica may be employed as the source of silica in the instant process.

Example 73

Fifty (50) grams of raw McNamee clay was mixed with 85.7 grams NaOH containing 77.5 wt. percent $Na_2O$, 45.5 grams of water and 88.6 grams of a silica sol containing 30 weight percent $SiO_2$, known commercially as Ludox. Mixing was carried out with vigorous agitation for about 2 minutes.

The resulting slurry was charged to a furnace at 600° F. and held at this temperature for 4 hours. The resulting fused product was crushed to a particle size of less than 60 mesh (Tyler) and mixed with 120 cc. of water for 2 minutes. The pre-digested slurry was thereafter diluted with 1890 cc. of water and digested in a covered container for 21 hours at 200° F.

The resulting product which settled to the bottom of the digestion vessel was separated from supernatant

PO-1050
(5/69)

UNITED STATES PATENT OFFICE
CERTIFICATE OF CORRECTION

Patent No. 3,431,218      Dated March 4, 1969

Inventor(s) Charles J. Plank and Edward J. Rosinski

It is certified that error appears in the above-identified patent and that said Letters Patent are hereby corrected as shown below:

Column 12, line 46, "place" should be --plate--; Column 12, line 62, "1/16" should be --1/64--. Column 16, line 53, "760°F" should be --76°F--. Column 19, line 69, "chlorine" should be --chloride--. Column 22, Table II, Example 9, second column, under heading Catalytic Evaluation:, sub-heading LHSV "4" should be --8--; Column 22, Table II, Example 7, under heading Δ Values to standard silica-alumina catalyst:2, sub-heading 10 RVP, vol. percent "+5.9" should be --+6.4--. Column 26, line 58, "drogel was prepared in the same manner as that de-" should be --hydrogel was formed at a lower pH of 7.5.--; Column 26, lines 59-60, drogen was prepared in the same manner as" should be --Thus, hydrogel was prepared in the same manner--; Column 26, lines 59-60, "that described in Example 18," should be --as that described in Example 18,--. Column 31, Table VI, under heading Physical Properties:, sub-heading sorption Base:, "sorption Base:" should be --Adsorption Base:--; Column 31, Table VI, heading " Δ adalytic Evaluation:" should be --Catalytic Evaluation--; Column 31, Table VI, under heading Catalytic Evaluation, sub-heading CtConversion, "CtConversion" should be --Conversion--. Column 35, line 27, Table IX, under heading Physical Properties, sub-heading Surface Area, "m.2/g.," should be --$m^2/g$--; Column 35, line 31, Table IX, under heading Catalytic Conversion, sub-heading Total $C_4$'s, "wt.percent" should be --vol.percent--; Column 35, line 71, "$Al_2A_3$" should be --$Al_2O_3$--. Column 45, line 38, Claim 17, "falls the" should be --falls within the--.

SIGNED AND
SEALED
APR 28 1970

(SEAL)
Attest:

Edward M. Fletcher, Jr.
Attesting Officer

WILLIAM E. SCHUYLER, JR.
Commissioner of Patents

forms, the amount of said water being such that the mole ratio of water to total alkali metal oxide is within the approximate range of 35 to 180, base exchanging the alkali metal crystalline aluminosilicate so formed to replace a major proportion of the alkali metal content thereof and to reduce the alkali metal content of the treated composite to below about 3 percent by weight.

16. A method for converting a natural hydrous aluminum silicate clay to X aluminosilicates or Y aluminosilicates which comprises contacting said clay with aqueous alkali metal hydroxide and a source of silica at a temperature between about 230° F. and about 1600° F. until a fused product is formed, the proportions of reactants being such that the composition of the reaction mixture falls within the following limits:

Wt. Ratio of Total Alkali Metal Oxide/Water-free clay =1.1 to 6.6
Wt. Ratio of Silicia/Water-free clay=0.1 to 3.7 grinding the resulting product to a particle size of less than 60 mesh, initially dispersing the finely ground solid in water, utilizing a water to solid weight ratio of approximately 1 to 3, for at least about 2 minutes thereafter diluting the resulting slurry with water in an amount such that the mole ratio of total added water to total alkali metal oxide is within the approximate range of 35 to 180 and digesting the resulting diluted mixture at a temperature between 180° F. and about 220° F. until crystalline aluminosilicate is formed.

17. A method of preparing a crystalline X aluminosilicate zeolite or a crystalline Y aluminosilicate zeolite which comprises contacting, in the form of an aqueous slurry, a natural hydrous aluminum silicate clay, alkali metal hydroxide and a source of silica at a temperature between about 230° F. and about 1600° F. until a fused product is formed, the proportions of the reactants being such that the composition of the reaction mixture falls the area ABCD of accompanying FIGURE 4, grinding the resulting product to a particle size of less than 60 mesh, initially dispersing the finely ground solid in water, utilizing a water to solid weight ratio of approximately 1 to 3 and maintaining said ratio for at least 2 minutes, thereafter diluting the resulting slurry with water in an amount such that the mole ratio of total added water to total added alkali metal oxide is within the approximate range of 35 to 180 and digesting the resulting product in water at a temperature in the approximate range of 180° F. to 220° F. until crystalline aluminosilicate forms.

18. A metthod for preparing a crystalline X aluminosilicate zeolite or a crystalline Y aluminosilicate zeolite which comprises contacting, in the form of an aqueous slurry, a natural hydrous aluminum silicate clay, alkali metal hydroxide and a source of silica at a temperature between about 230° F. and about 1600° F. until a fused product is formed, the proportions of the reactants being such that the composition of the reaction mixture falls within the area EFGH of accompanying FIGURE 4, grinding the resulting product to a particle size of less than 60 mesh, initially dispersing the finely ground solid in water, utilizing a water to solid weight ratio of approximately 1 to 3 and maintaining said ratio for at least about 2 minutes, thereafter diluting the resulting slurry with water in an amount such that the mole ratio of total added water to total added alkali metal oxide is within the approximate range of 35 to 180 and digesting the resulting product in water at a temperature in the approximate range of 180° F. to 220° F. until crystalline aluminosilicate forms.

19. The method of claim 17 wherein the source of silica is an alkali metal silicate.

20. The method of claim 17 wherein the source of silica is sand.

21. The method of claim 17 wherein the source of silica is a colloidal suspension of silica.

22. A method for converting a natural hydrous aluminum silicate clay to X aluminosilicates or Y aluminosilicates which comprises contacting said clay with aqueous alkali metal hydroxide and a source of silica at a temperature between about 230° F. and about 1600° F. until a fused product is formed, the proportions of the reactants being such that the composition of the reaction mixture falls within the area ABCD of accompanying FIGURE 4, grinding the resulting product to a particle size of less than 60 mesh, initially dispersing the finely ground solid in water, utilizing a water to solid weight ratio of approximately 1 to 3 and maintaining said ratio for at least about 2 minutes, thereafter diluting the resulting slurry with water in an amount such that the mole ratio of total added water to total added alkali metal oxide is within the approximate range of 35 to 180 and digesting the diluted mixture at a temperature between about 180° F. and about 220° F. until crystalline aluminosilicate forms.

23. A method for preparing a crystalline X aluminosilicate zeolite or a crystalline Y aluminosilicate which comprises contacting, in the form of an aqueous slurry, a natural hydrous aluminum silicate clay, alkali metal hydroxide and a source of silica at a temperature between about 230° F. and about 1600° F. until a fused product is formed, the proportions of reactants being such that the composition of the reaction mixture falls within the following limits:

Wt. Ratio of Total Alkali Metal Oxide/Water-free clay=1.1 to 6.6
Wt. Ratio of Silica/Water-free clay=.01 to 3.7 grinding the resulting product to a particle size of less than 60 mesh, initially dispersing the finely ground solid in water, utilizing a water to solid weight ratio of approximately 1 to 3 and maintaining said ratio for at least about 2 minutes, thereafter diluting the resulting slurry with water in an amount such that the mole ratio of total added water to total added alkali metal oxide is within the approximate range of 35 to 180 and digesting the resulting product in water at a temperature in the approximate range of 180° F. to 220° F. until crystalline aluminosilicate forms, and spray drying the slurry of the crystalline aluminosilicate so formed to yield a product in finely divided form.

24. A method for preparing a catalytic composition which comprises contacting a natural hydrous aluminum silicate clay with aqueous sodium hydroxide and a material selected from the group consisting of sodium silicate and water glass under the hereinafter recited conditions for a period of between about 3 minutes and about 72 hours at a temperature between about 230° F. and about 1600° F., the proportions of reactants being such that the composition of the reaction mixture falls within the following limits:

Wt. Ratio of Total Alkali Metal Oxide/Water-free clay=1.1 to 5.1
Wt. Ratio of Added Silica/Water-free clay=0.19 to 3.3 grinding the resulting product to a particle size of less than 60 mesh and dispersing the finely ground solid in water, utilizing initially a water to solid weight ratio of approximately 1 to 3 and thereafter diluting the resulting slurry with water in an amount such that the mole ratio of total added water to total alkali metal oxide is within the approximate range of 35 to 115, digesting the resulting diluted mixture at a temperature between about 180° F. and about 220° F. until a crystalline alkali metal aluminosilicate forms, base exchanging the resulting alkali metal aluminosilicate with a solution containing at least one ion selected from the group consisting of alkaline earth metals, transition metals, rare earth metals, ammonium and hydrogen to replace a major proportion of the alkali metal content of said aluminosilicate and to reduce the alkali metal contents of the treated composite to below 3 percent by weight.

References Cited

UNITED STATES PATENTS 2,962,435  11/1960  Fleck et al. _____ 208—119
2,971,904  2/1961   Gladrow et al. __ 252—445 XR
3,101,251  8/1963   Howell _____ 23—113
3,114,603  12/1963  Howell _____ 23—113
3,119,659  1/1964   Taggart et al. _____ 23—112

DANIEL E. WYMAN, *Primary Examiner.*

C. F. DEES, *Assistant Examiner.*

U.S. Cl. X.R.

23—112; 208—120; 252—453

PO-1050
(5/69)

UNITED STATES PATENT OFFICE
CERTIFICATE OF CORRECTION

Patent No. 3,431,218                    Dated March 4, 1969

Inventor(s) Charles J. Plank and Edward J. Rosinski

It is certified that error appears in the above-identified patent and that said Letters Patent are hereby corrected as shown below:

Column 12, line 46, "place" should be --plate--;  Column 12, line 62, "1/16" should be --1/64--.  Column 16, line 53, "760°F" should be --76°F--.  Column 19, line 69, "chlorine" should be --chloride--.  Column 22, Table II, Example 9, second column, under heading Catalytic Evaluation:, sub-heading LHSV "4" should be --8--;  Column 22, Table II, Example 7, under heading Δ Values to standard silica-alumina catalyst:2, sub-heading 10 RVP, vol. percent "+5.9" should be --+6.4--.  Column 26, line 58, "drogel was prepared in the same manner as that de-" should be --hydrogel was formed at a lower pH of 7.5.--;  Column 26, lines 59-60, drogen was prepared in the same manner as" should be --Thus, hydrogel was prepared in the same manner--;  Column 26, lines 59-60, "that described in Example 18," should be --as that described in Example 18,--.  Column 31, Table VI, under heading Physical Properties:, sub-heading sorption Base:, "sorption Base:" should be --Adsorption Base:--;  Column 31, Table VI, heading " Δ adalytic Evaluation:" should be --Catalytic Evaluation--;  Column 31, Table VI, under heading Catalytic Evaluation, sub-heading CtConversion, "CtConversion" should be --Conversion--.  Column 35, line 27, Table IX, under heading Physical Properties, sub-heading Surface Area, "m.2/g.," should be --$m^2/g$--;  Column 35, line 31, Table IX, under heading Catalytic Conversion, sub-heading Total $C_4$'s, "wt.percent" should be --vol.percent--;  Column 35, line 71, "$Al_2A_3$" should be --$Al_2O_3$--.  Column 45, line 38, Claim 17, "falls the" should be --falls within the--.

SIGNED AND
SEALED
APR 28 1970

(SEAL)
Attest:

Edward M. Fletcher, Jr.
Attesting Officer

WILLIAM E. SCHUYLER, JR.
Commissioner of Patents